US012312040B2

(12) United States Patent
Santorufo

(10) Patent No.: US 12,312,040 B2
(45) Date of Patent: May 27, 2025

(54) BICYCLE UNDERSEAT STORAGE WITH LIGHT AND WHEEL GUARD

(71) Applicant: PakBrite LLC, Wilsonville, OR (US)

(72) Inventor: Anthony R. Santorufo, Wilsonville, OR (US)

(73) Assignee: PAKBRITE LLC, Wilsonville, OR (US)

( * ) Notice: Subject to any disclaimer, the term of this patent is extended or adjusted under 35 U.S.C. 154(b) by 187 days.

(21) Appl. No.: 18/172,179

(22) Filed: Feb. 21, 2023

(65) Prior Publication Data
US 2024/0278865 A1 Aug. 22, 2024

(51) Int. Cl.
*B62J 9/20* (2020.01)
*B62J 6/00* (2020.01)
*B62J 15/02* (2006.01)

(52) U.S. Cl.
CPC . *B62J 9/20* (2020.02); *B62J 6/00* (2013.01); *B62J 15/02* (2013.01)

(58) Field of Classification Search
CPC ................ B62J 9/26; B62J 9/27; B62J 15/02
USPC ........ 224/427, 414, 431, 420; 220/630, 480, 220/481, 288, 290, 293
See application file for complete search history.

(56) References Cited

U.S. PATENT DOCUMENTS

| | | | |
|---|---|---|---|
| 632,858 A | 9/1899 | Waibel et al. | |
| 650,272 A * | 5/1900 | Perry | A47H 1/122 403/348 |
| 4,040,549 A * | 8/1977 | Sadler | B60N 3/103 248/346.11 |
| 4,127,211 A * | 11/1978 | Zerbey | A47G 19/2205 248/346.11 |
| 4,469,345 A * | 9/1984 | Weiss | B62J 9/40 224/435 |
| 4,809,890 A * | 3/1989 | Tsigadas | B62J 9/22 248/553 |
| 5,217,116 A * | 6/1993 | Ku | B62J 9/40 81/177.4 |
| 5,501,363 A * | 3/1996 | Muller | G10K 11/08 220/709 |
| 5,878,930 A | 3/1999 | Schwimmer | |
| 6,271,753 B1 * | 8/2001 | Shukla | B65D 55/028 340/571 |
| 6,837,407 B1 * | 1/2005 | Towers | B62J 9/22 224/435 |

(Continued)

*Primary Examiner* — Justin M Larson
(74) *Attorney, Agent, or Firm* — J. Douglas Wells

(57) ABSTRACT

A bicycle storage accessory mountable on a bicycle frame or seat post that includes a cylindrical container providing an enclosed interior space, a rear facing lid that incorporates an LED light, and a mounting bracket. Correspondingly mating attachment structures on the container and mounting bracket include a first portion having protrusions extending radially outward from an axis of rotation of the container, and a second portion having pockets extending radially outward from the axis of rotation. The container connects to the mounting bracket via axially bringing the two together, then rotating one or the other so that each radial protrusion is received into a respective pocket. A locking mechanism prevents undesired back rotation. The LED lid incorporates a two-stage magnetic locking system with haptic feedback and structures for attaching the LED lid to the mounting bracket. A wheel guard may be attached between the mounting bracket and container.

20 Claims, 14 Drawing Sheets

(56) References Cited

U.S. PATENT DOCUMENTS

| | | | |
|---|---|---|---|
| 6,962,272 B2* | 11/2005 | LeBlond | A47K 5/12 |
| | | | 222/321.9 |
| 7,654,550 B2 | 2/2010 | Chuang | |
| 7,798,346 B2* | 9/2010 | Nelson | B65D 81/3205 |
| | | | 220/23.6 |
| 8,109,423 B2* | 2/2012 | Bigolin | B62J 11/04 |
| | | | 224/427 |
| 8,191,844 B2* | 6/2012 | Pennino | B62J 11/04 |
| | | | 248/220.21 |
| 8,317,048 B2* | 11/2012 | Hajichristou | B65D 43/0225 |
| | | | 220/230 |
| 8,495,803 B2* | 7/2013 | Fiedler | A45C 13/1069 |
| | | | 70/160 |
| 8,636,167 B2* | 1/2014 | Hajichristou | B65D 50/061 |
| | | | 220/230 |
| 8,657,317 B2 | 2/2014 | Syu | |
| 8,757,413 B1* | 6/2014 | Kephart | B62J 9/22 |
| | | | 206/804 |
| 8,757,418 B2* | 6/2014 | Zimmerman | A47G 29/093 |
| | | | 248/205.8 |
| 8,777,075 B2* | 7/2014 | Bretl | B62J 9/21 |
| | | | 224/148.2 |
| 8,960,700 B2 | 2/2015 | Ellis | |
| 9,630,670 B2* | 4/2017 | Bolosan | B62H 5/001 |
| 9,821,937 B2* | 11/2017 | Staeben | B65D 51/248 |
| 10,859,290 B2* | 12/2020 | Herweck | F24F 5/0017 |
| 11,878,758 B2* | 1/2024 | Wen | B62J 11/04 |
| 12,089,758 B2* | 9/2024 | Keast | A47G 23/0216 |
| 2005/0035166 A1* | 2/2005 | Kresge | B62J 9/23 |
| | | | 224/431 |
| 2006/0196322 A1 | 9/2006 | Chuang | |
| 2010/0263173 A1* | 10/2010 | Clarke | A41F 1/002 |
| | | | 24/303 |
| 2012/0138605 A1* | 6/2012 | Grundy | B62B 5/0083 |
| | | | 220/259.3 |
| 2012/0187170 A1 | 7/2012 | Ho | |
| 2015/0315821 A1 | 11/2015 | Zuraski et al. | |
| 2017/0188731 A1* | 7/2017 | Schuller | A47G 23/16 |
| 2017/0297643 A1 | 10/2017 | Chuang | |
| 2022/0151439 A1* | 5/2022 | Fantappie | A47J 41/0072 |

\* cited by examiner

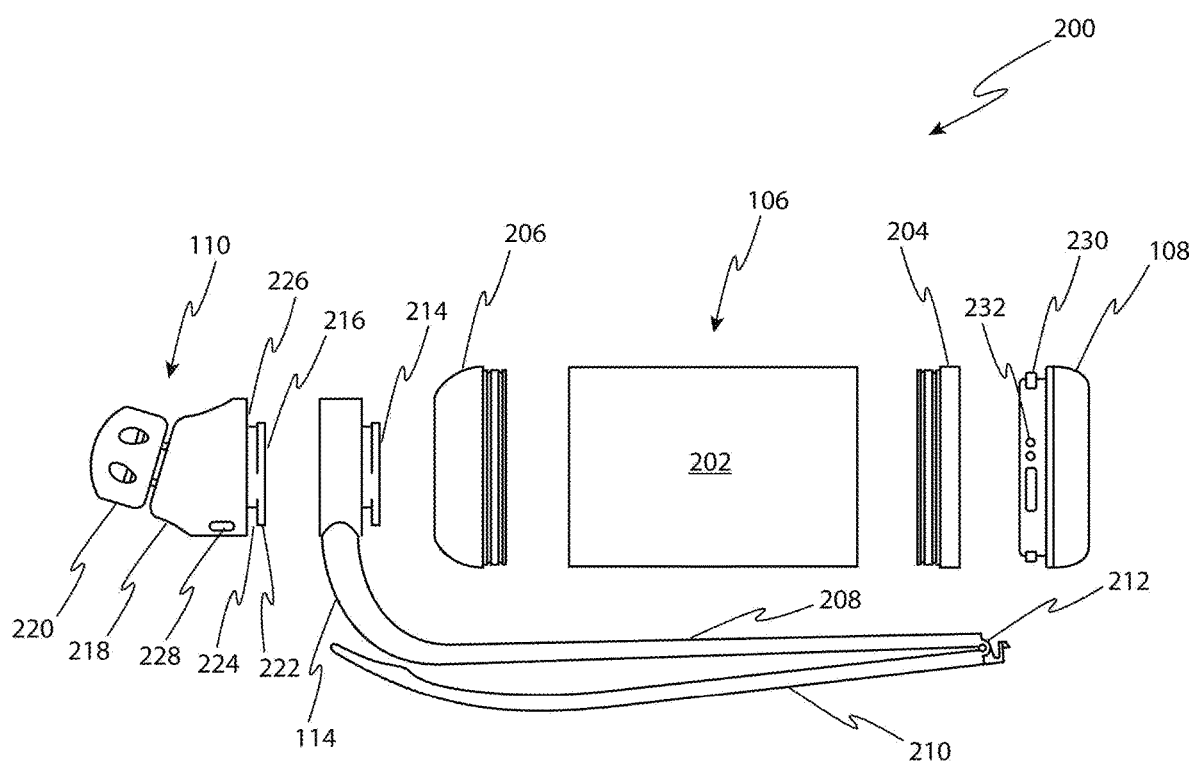
Fig. 2
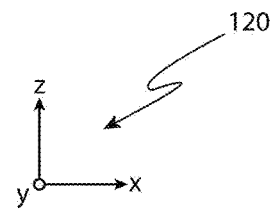

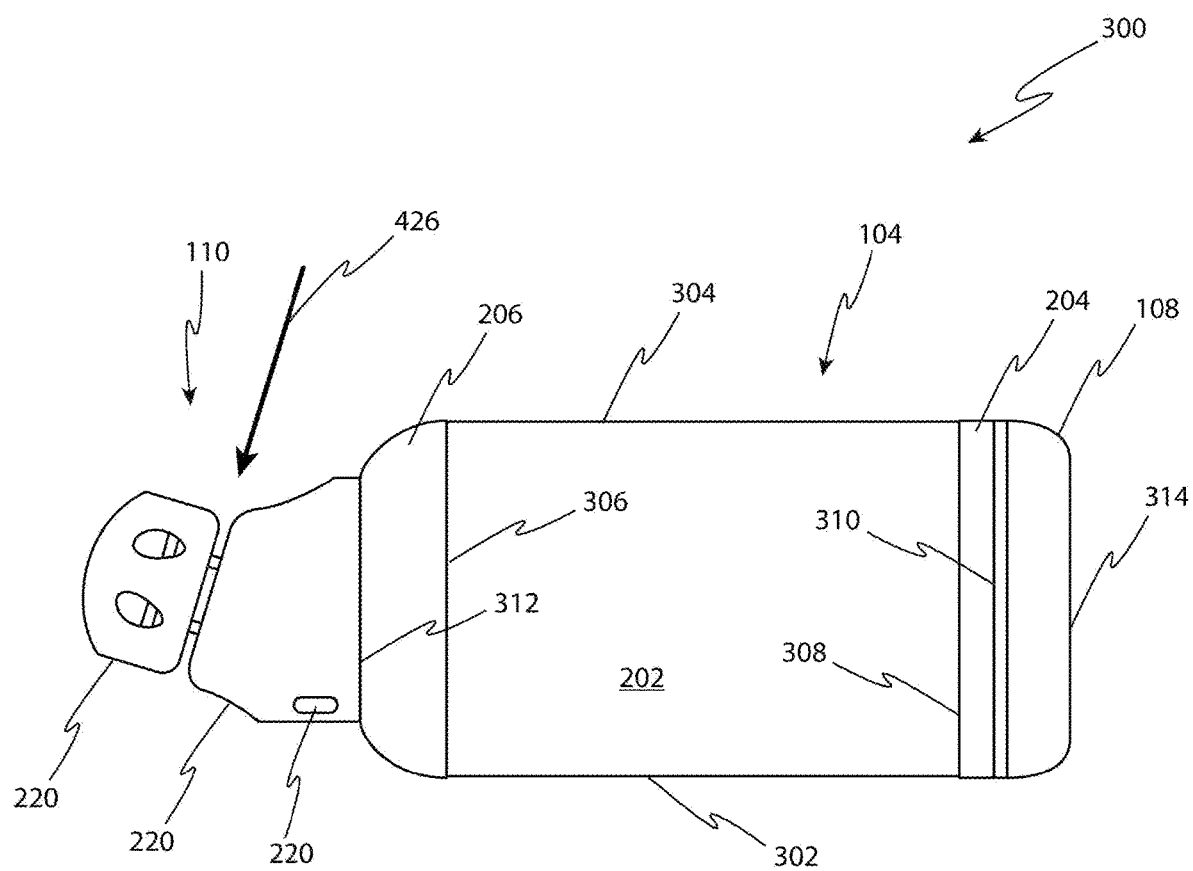
Fig. 3
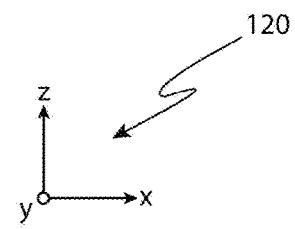

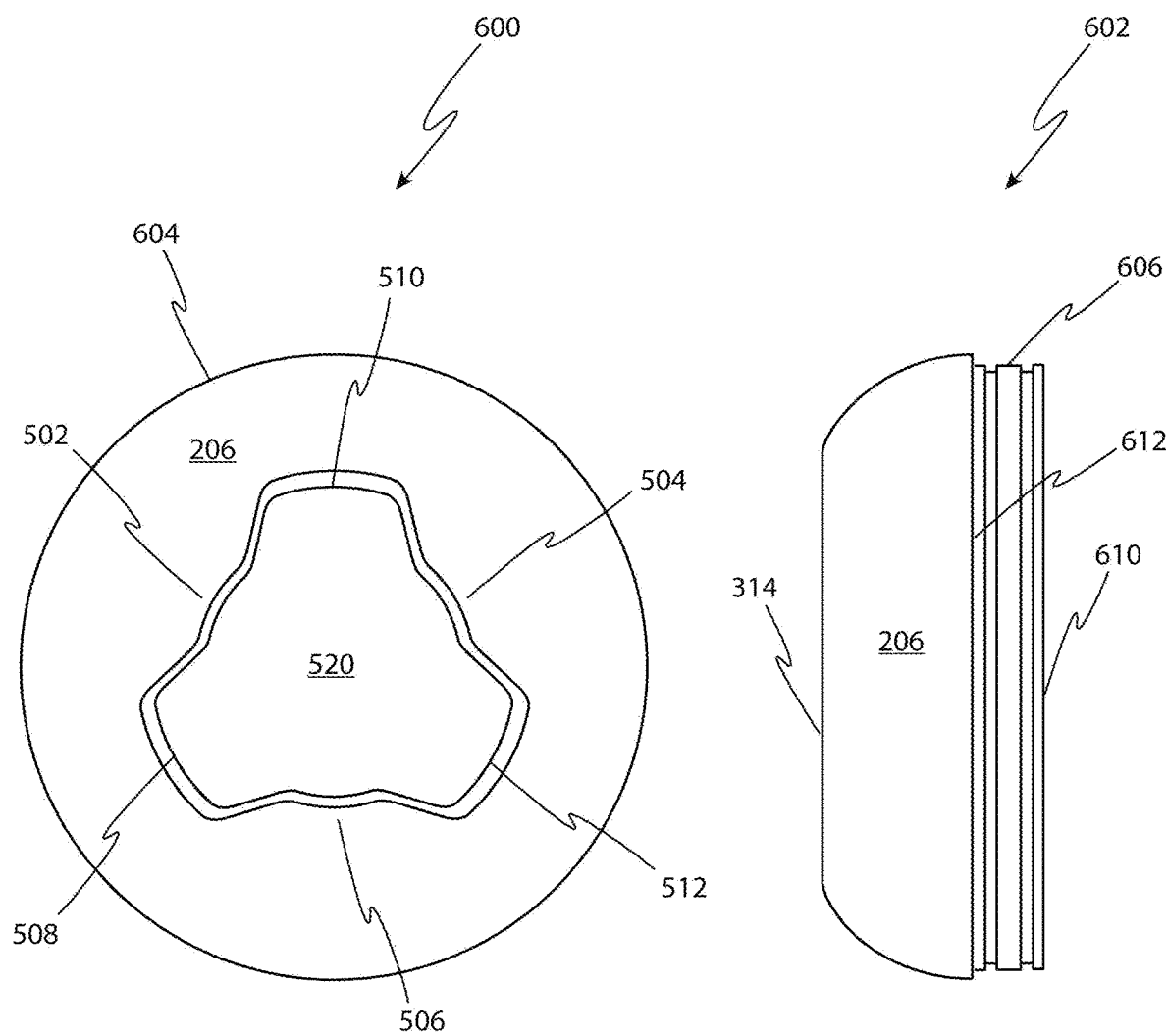
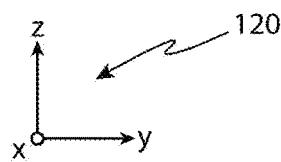
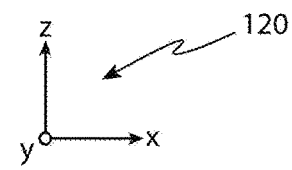
Fig. 6A
Fig. 6B

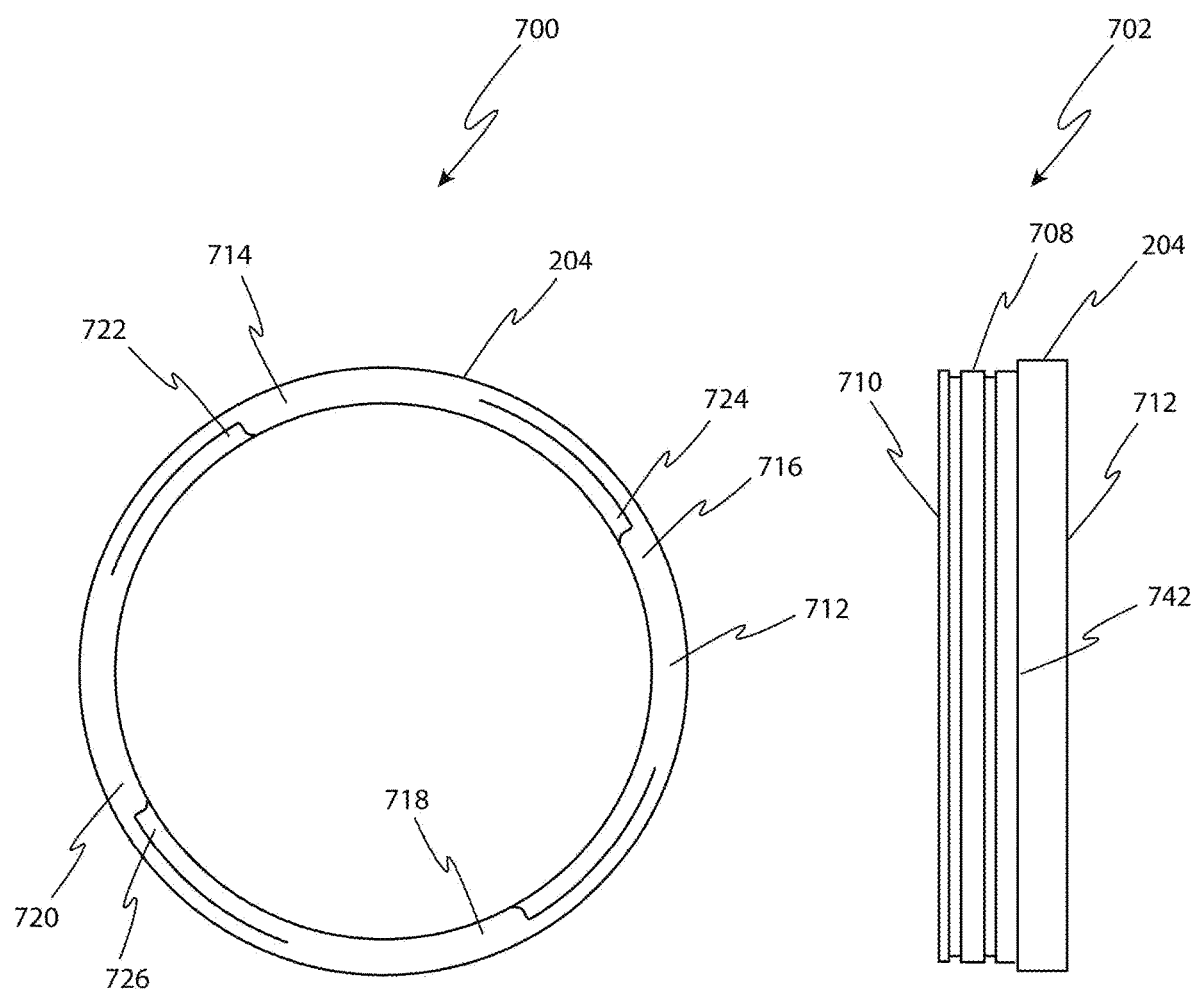
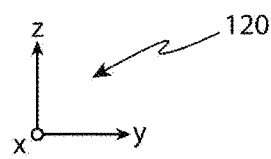
Fig. 7A
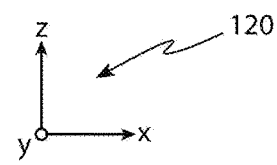
Fig. 7B

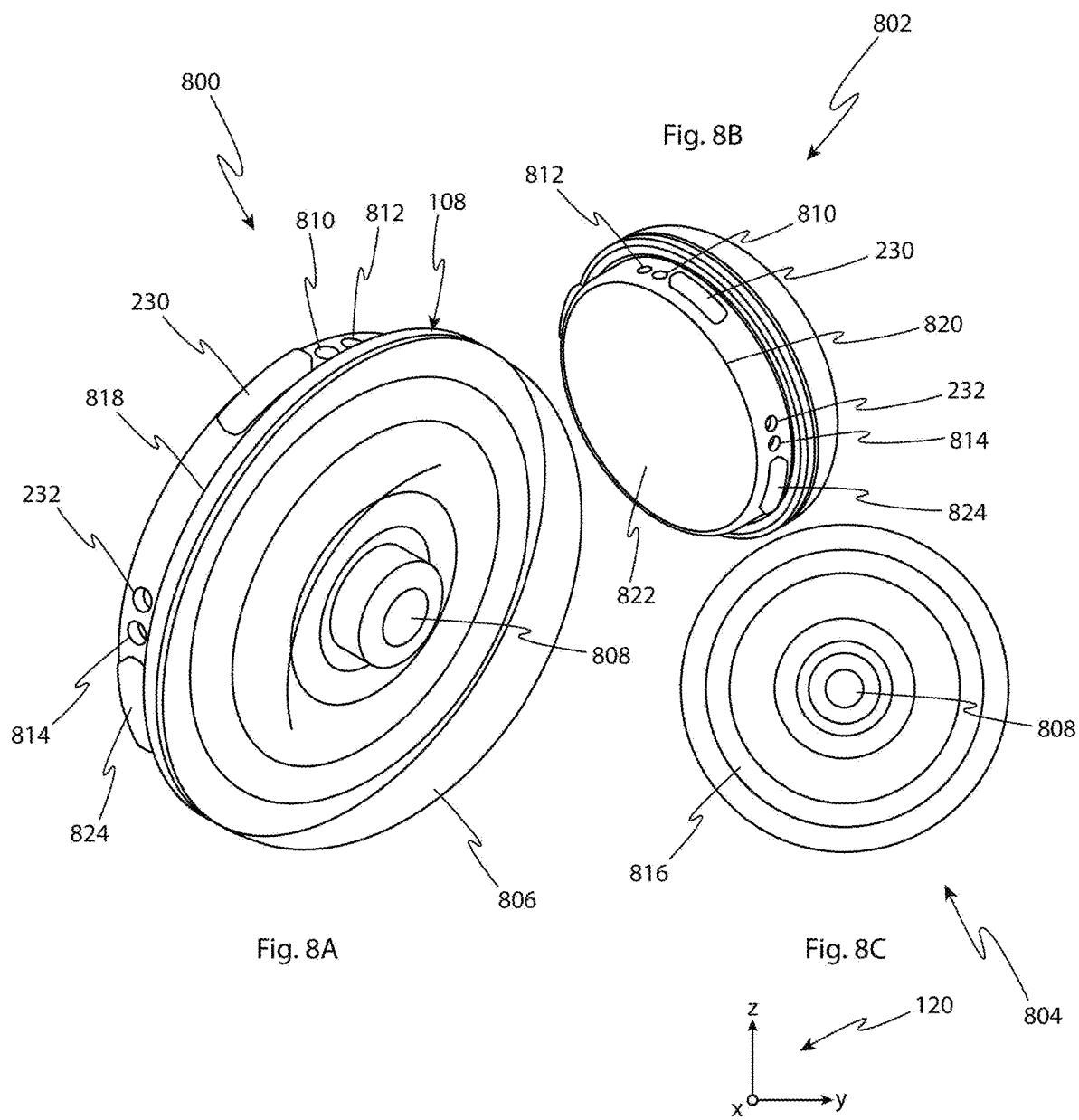

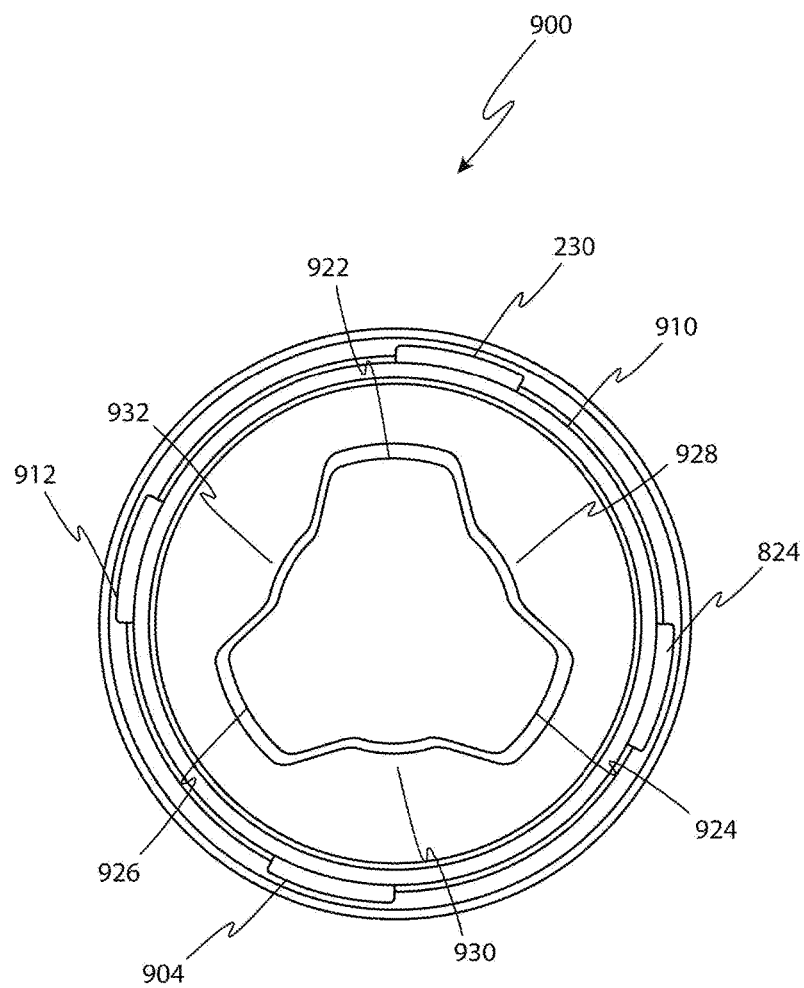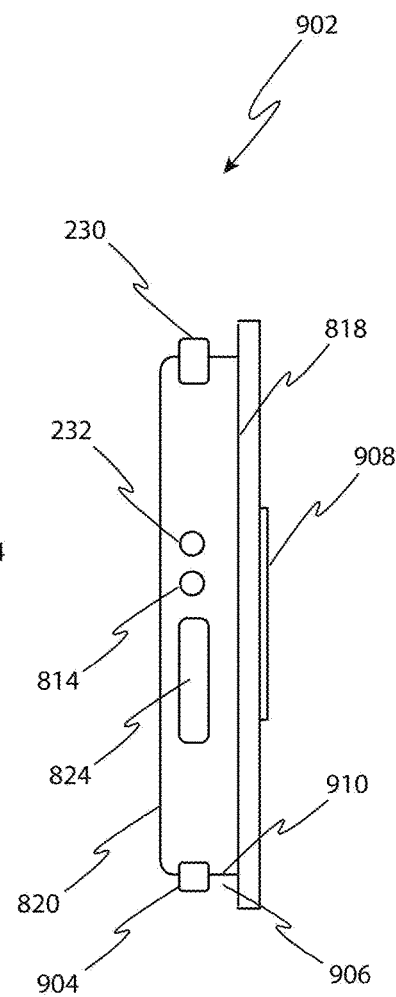
Fig. 9A
Fig. 9B
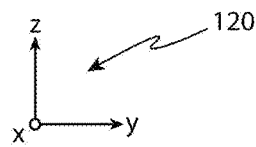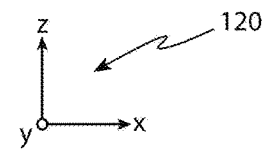

BICYCLE UNDERSEAT STORAGE WITH LIGHT AND WHEEL GUARD

FIELD

The present disclosure relates to improving bicycle accessories, and, more particularly, to improving underseat storage accessories.

BACKGROUND AND SUMMARY

Bicycle accessories include various items such as lights, water bottles, locks, racks, baskets, mirrors, and bags that typically attached to the frame, or handlebars, or seat post, or other components of the bike. Various underseat storage accessories are available. Some attach to the frame, seat post, and/or saddle/seat structures such as the saddle clamp or saddle rails. Some underseat storage accessories comprise flexible material bags or semi-rigid bags that attach via hook and loop type flexible material securements to the seat post and/or seat post receiving portion of the bike frame and one or both of the saddle rails. Existing accessories may prevent use of or require repositioning of rearward facing safety lights (that may otherwise be fastened to a rearward facing underseat position). Existing accessories may not be aerodynamic. Existing accessories may not be easily removed and reliably and securably re-attached. Existing accessories may not incorporate the use of advanced materials, or incorporate unique and/or iconic design/aesthetic features, or include flexibility in terms of configurability to add further cooperatively attached features such as rearward facing lighting and/or other features such as a rearward extending wheel guard (or fender).

To address at least some of the aforementioned and other needs, embodiments for an improved bicycle underseat storage accessory with light and wheel guard are provided.

According to one aspect, a bicycle storage accessory mounting bracket includes: a mounting bracket body configured to securably attach to a component of a bicycle; and correspondingly mating bracket attachment structures on each of the mounting bracket body and an accessory-to-be attached to the bicycle via the mounting bracket body, the correspondingly mating bracket attachment structures comprising a first portion formed on the accessory-to-be attached or the mounting bracket body and having a plurality of protrusions extending radially, parallel to a z-y plane, about an axis of rotation running along an x-axis direction, the correspondingly mating bracket attachment structures comprising a second portion formed on an opposite one of the accessory-to-be attached and the mounting bracket body and having a plurality of pockets extending radially, parallel to the z-y plane, about the axis of rotation running along the x-axis direction, and the correspondingly mating bracket attachment structures configured so as to permit the accessory-to-be attached to be fixedly secured to the mounting bracket body by, first, moving the accessory-to-be attached and the mounting bracket body toward one another so that the first portion of the correspondingly mating bracket attachment structures is received by the second portion of the correspondingly mating bracket attachment structures, and, second, rotating the first and/or second portions of the correspondingly mating bracket attachment structures about the x-axis with respect to one another such that each of the plurality of protrusions of the first portion of the correspondingly mating bracket attachment structures are received into respective ones of the plurality of pockets of the second portion of the correspondingly mating bracket attachment structures.

According to an aspect, the accessory-to-be attached includes: a cylindrically shaped container body defining an interior space therewithin; a lid configured to cover an opening in the container body so as to enclose the interior space, the lid comprising a light emitting diode (LED) light; and correspondingly mating lid attachment structures on each of the container body and the lid, the correspondingly mating lid attachment structures comprising a first portion formed on the container body or the lid and having a plurality of protrusions extending radially, parallel to the z-y plane, about the axis of rotation running along the x-axis direction, the correspondingly mating lid attachment structures comprising a second portion formed on an opposite one of the container body and the lid and having a plurality of pockets extending radially, parallel to the z-y plane, about the axis of rotation running along the x-axis direction, and the correspondingly mating lid attachment structures configured so as to permit the lid to be fixedly secured to the container body by, first, moving the container body and the lid toward one another so that the first portion of the correspondingly mating lid attachment structures is received by the second portion of the correspondingly mating lid attachment structures, and, second, rotating the first and/or second portions of the correspondingly mating lid attachment structures about the x-axis with respect to one another such that each of the plurality of protrusions of the first portion of the correspondingly mating lid attachment structures are received into respective ones of the plurality of pockets of the second portion of the correspondingly mating lid attachment structures.

According to an aspect, the correspondingly mating lid attachment structures include at least one anti-rotation magnet configured to urge the lid into a rotationally locked position whereby the first portion of the correspondingly mating lid attachment structures are positioned within respective ones of the plurality of pockets of the second portion of the correspondingly mating lid attachment structures and to provide a user haptic feedback and/or audible feedback as the user rotates the lid into the rotationally locked position, and wherein the correspondingly mating lid attachment structures include at least one pull-in magnet configured to urge the lid toward the container body and to provide a user haptic feedback and/or audible feedback as the user positions the lid proximate to the container body, whereafter the lid is rotatable into the rotationally locked position.

According to an aspect, accessory-to-be attached is a wheel guard configured to permit connecting the wheel guard to the mounting bracket body and connecting the container body to the wheel guard, the wheel guard comprising correspondingly mating wheel guard attachment structures on each of two oppositely facing sides of the wheel guard, the correspondingly mating wheel guard attachment structures comprising a first portion formed on a first side facing the mounting bracket body or a second side facing the container body and having a plurality of protrusions extending radially, parallel to the z-y plane, about the axis of rotation running along the x-axis direction, the correspondingly mating wheel guard attachment structures comprising a second portion formed on an opposite one of the first side facing the mounting bracket body and the second side facing the container body and having a plurality of pockets extending radially, parallel to the z-y plane, about the axis of rotation running along the x-axis direction, and the correspondingly mating wheel guard attachment structures configured so as to permit the wheel guard to be fixedly secured to the mounting bracket body by, first, moving the wheel guard and the mounting bracket body toward one another, and, second, rotating the wheel guard and the mounting bracket body with respect to one another such that the correspondingly mating wheel guard attachment structures engage with the mounting bracket body so as to secure the wheel guard to the mounting bracket body.

According to an aspect, the plurality of protrusions extending radially, parallel to the z-y plane, about the axis of rotation running along the x-axis direction, comprises three protrusions, and wherein a push button locking mechanism is positioned between a pair of adjacent ones of the three protrusions, the push button locking mechanism having a button urged so as to extend parallel to the x-axis direction and configured to prevent rotational movement between the container body and the mounting bracket body when the three protrusions of the correspondingly mating bracket attachment structures are positioned within respective ones of the plurality of pockets of the correspondingly mating bracket attachment structure.

According to an aspect, the mounting bracket body is configured to attach to a bicycle frame or a bicycle seat post, and the accessory-to-be attached comprises a light emitting diode (LED) light configured to permit connecting the LED light to the mounting bracket body.

According to an aspect, the mounting bracket body comprises an rearward portion positioned adjacent to an forward portion, the forward portion configured to attach to the bicycle frame or the bicycle seat post, and the rearward portion having the first or second portion of the correspondingly mating bracket attachment structures formed thereon and having an adjustment rail configured to permit moving the first or second portion of the correspondingly mating bracket attachment structures, with respect to the forward portion, upward and downward along an arcuate path that is parallel to the z-x plane and about a pivot axis that is parallel to the y-axis direction, thereby permitting adjustment of an alignment between the forward and rearward portions of the mounting bracket body.

According to an aspect, the mounting bracket body includes a locking bolt configured to securely fix a position of the rearward portion in relation to the forward portion.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter and are not intended to limit the scope of the present disclosure in any way.

FIG. 2 is a side elevation exploded view of an underseat storage system with light and wheel guard, according to various embodiments.

FIG. 3 is a side elevation view of a container with lid (or LED lid) closed over an otherwise open end of the container and attached to a mounting bracket, as an exemplary combination of accessory parts comprising an underseat storage system, according to embodiments.

FIGS. 4A, 4B, and 4C are front perspective, rear (or back) perspective, and rear (or back) elevation views, respectively, of a mounting bracket/mounting bracket system, according to various embodiments.

FIGS. 6A and 6B are front elevation and side elevation views, respectively, of a front end closure (or puck) component of a container, according to embodiments.

FIGS. 7A and 7B are rear (or back) elevation and side elevation views, respectively, of a rear (or back) (or ring) component of a container, according to embodiments.

FIGS. 8A, 8B, and 8C are rear (or back) perspective, front perspective, and rear (or back) elevation views, respectively, of a container cover (or lid, or LED lid), according to various embodiments.

FIGS. 9A and 9B are front elevation and side elevation views, respectively, of a container cover (or lid, or LED lid) without a transparent outer/rearward cover thereof, according to various embodiments.

Similar reference numerals may have been used in different figures to denote similar components. FIGS. 1-13 (i.e., all the figures) are shown with components in proportional size with one another, according to some embodiments.

DETAILED DESCRIPTION

Figure 1:
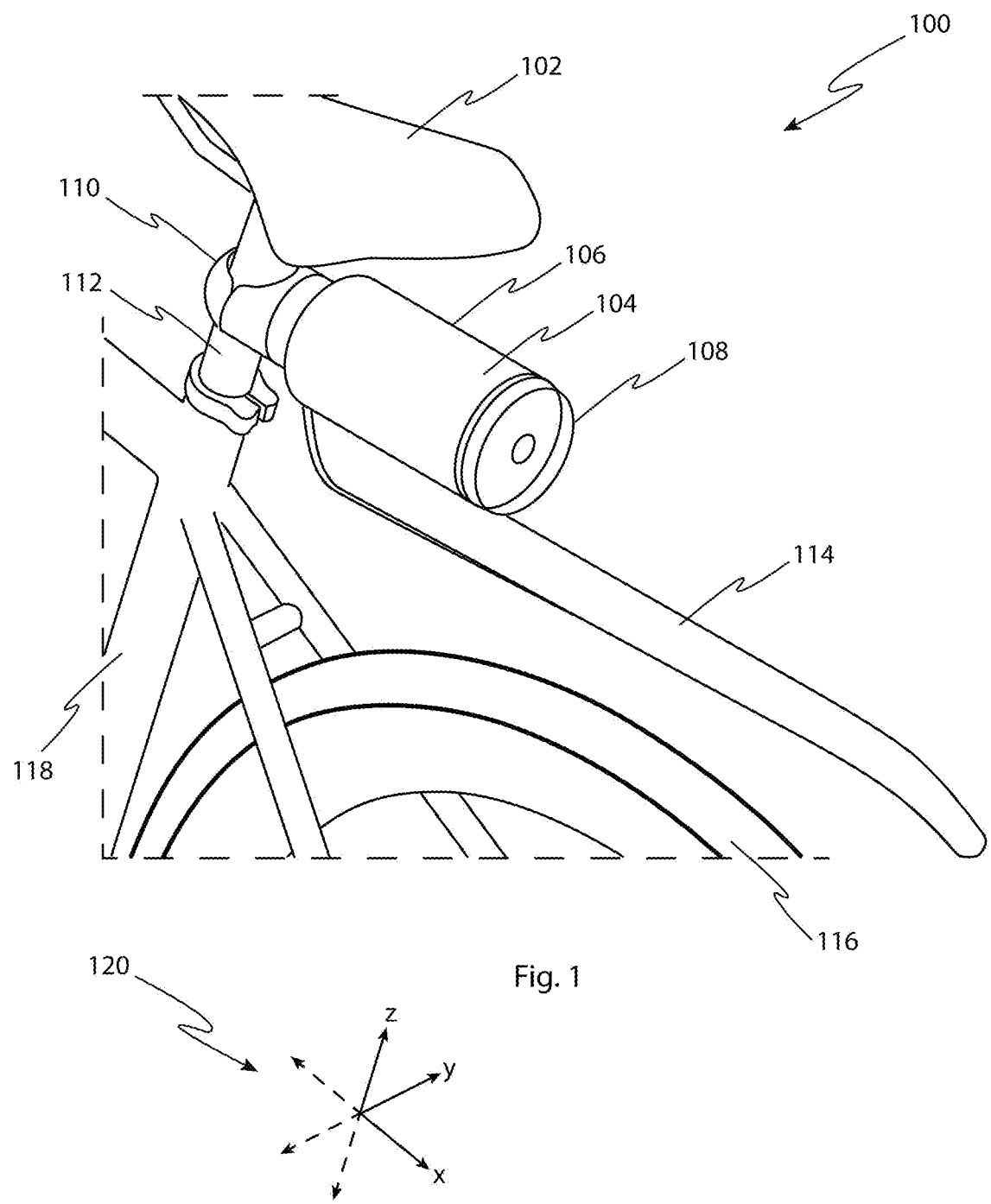
FIG. 1 illustrates a (rear or back) perspective view of an underseat storage system with a light and a wheel guard, the storage system being attached to a seat post component of a bicycle, according to various embodiments.

It is to be understood that the disclosure may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 4:
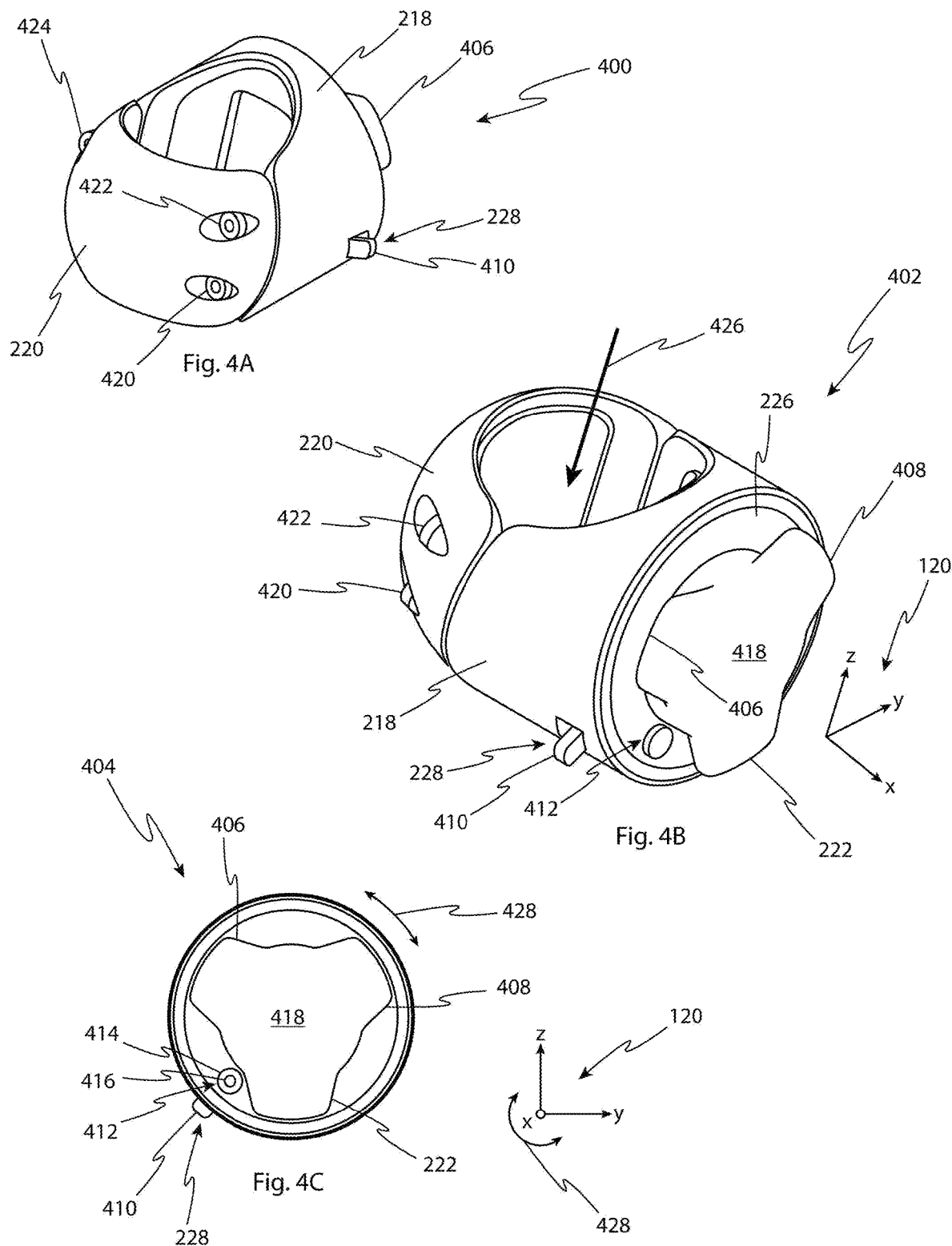
Figure 5:
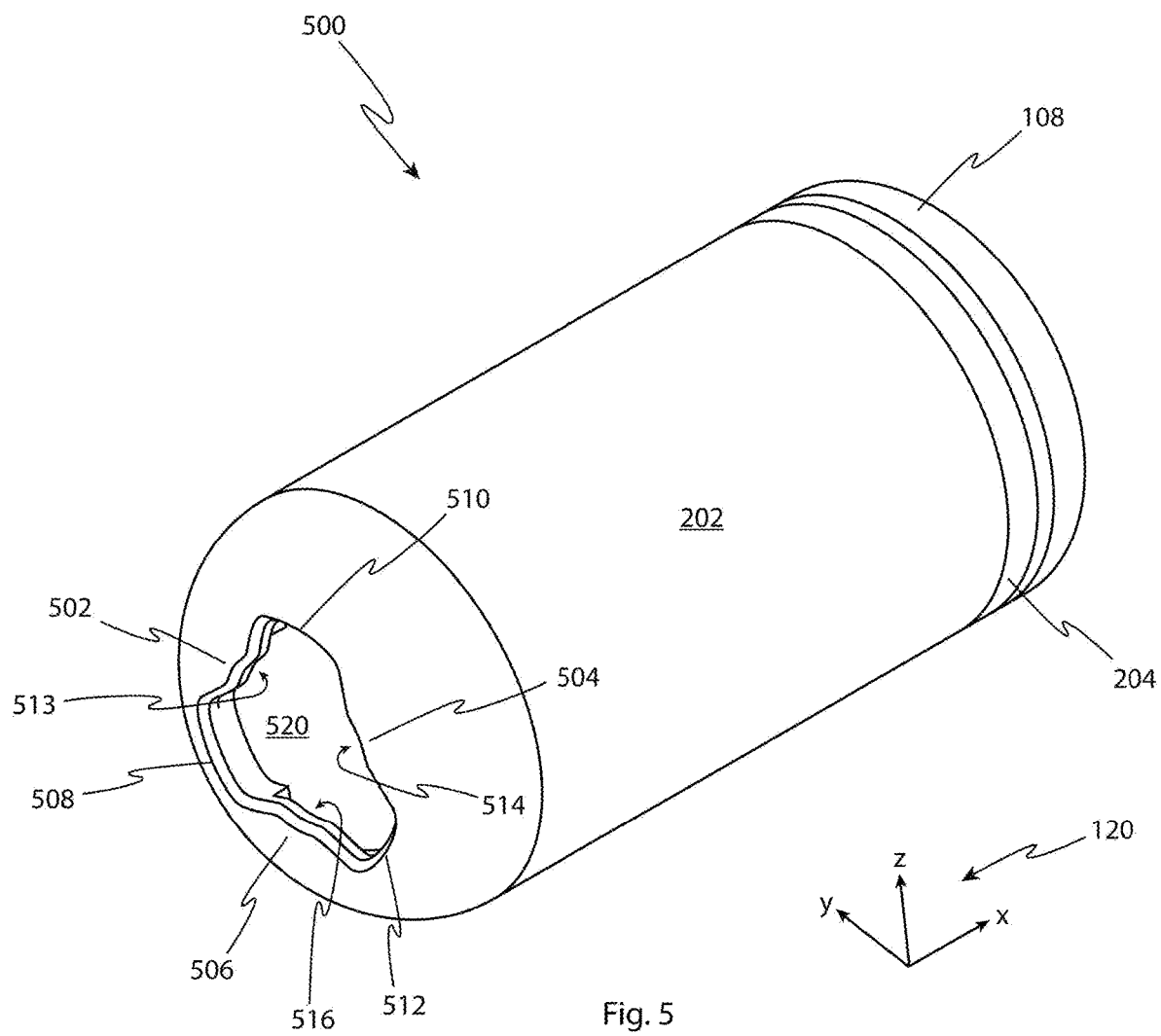
FIG. 5 is a front perspective rear view of a container with lid closed over an opening in the container (or storage pod, or container assembly with lid), according to various embodiments.

The following description relates to various embodiments of an underseat storage system with a light and a wheel guard, the storage system being attachable to a bicycle component such as a frame or seat post of the bicycle, according to various embodiments. As an overview, FIG. 1 shows a cylindrical storage container with a light and wheel guard attached to a seat post of a bicycle, and FIG. 2 shows an exploded view of the constituent parts as assembled in FIG. 1. FIG. 3 shows an embodiment that includes a mounting bracket and container with LED light. FIGS. 4A, 4B, and 4C provide detail views of an embodiment of a mounting bracket assembly. FIGS. 5, 6A, and 6B show details of an embodiment of a container body end that connects with correspondingly mating structures of a mounting bracket. FIGS. 7A, 7B, 7C, and 7D show details of an embodiment of a ring component of an open end of a container. FIGS. 8A, 8B, 8C, 9A, and 9B show details of an embodiment of a lid/LED lid. And FIGS. 10-13 show details of an embodiment of a mounting bracket that provides additional adjustment functionality.

Although the embodiments may be described in detail in the context of (as accessories for a bicycle) an underseat storage accessory, an underseat wheel guard accessory, an underseat storage accessory having a light, and an underseat storage accessory having a light and wheel guard, each may be attached other than specifically under a seat of a bicycle, and individual aspects may have other applications. For example, a mounting bracket/mounting bracket assembly as disclosed herein may be configured for attachment to other parts or components of a bicycle so as to provide an attachment point or mounting point. For example, a mounting bracket/mounting bracket assembly/mounting bracket system as described herein may be configured to attach to a handle bar of a bicycle, so as to, for instance, provide a mounting point for a storage container (which may be as described herein) or some other accessory having suitably correspondingly mating attachment structures formed thereon. As another example, a mounting bracket/mounting bracket assembly/mounting bracket system as described herein may be configured to attach to a handle bar of a bicycle or a frame component of the bicycle, so as to, for instance, provide a mounting point for a water bottle (having suitably correspondingly mating structures formed thereon or therewith) or for a light (having suitably correspondingly mating structures formed thereon or therewith).

Further, the correspondingly mating attachment structures described herein, particularly with reference to attaching a storage container (as described herein) via a mounting bracket (as described herein) may be oppositely oriented than shown and primarily described herein. That is, the radial protrusions shown formed on the rearward facing portion of the mounting bracket may instead be formed on the forward facing portion of the storage container (i.e., opposite to the configuration shown in the figures herein). Likewise, the radial protrusions shown formed on the rearward facing portion of the wheel guard may instead be formed on the forward facing portion of the wheel guard. The below described push button locking mechanism, while described as formed and configured within a portion of the component that includes the radial protrusions, may instead be formed and configured within an oppositely oriented portion of the component that includes the correspondingly mating radially extending pockets sized and oriented for receiving each of the radial protrusions. Further, the closure structures formed and configured on the lid that covers the opening in the storage container (to enclose the interior space therein) may instead be formed opposite from the orientation shown and described. For example, radial protrusions shown and described as formed on the lid may instead be formed on the storage container, with correspondingly mating structures (e.g., pockets/receptacles) formed on the lid.

Additionally, while several components and structures are shown in exemplary shapes, alternative shapes may be used. For example, the storage container is shown and described in the context of a cylindrically shaped tube and having end components with circular cross sections, and the lid closing over an opening in the storage container is shown and described, as well, as having a substantially cylindrical (with circular cross section) shape. However, the shapes of the components and structures may be other than cylindrical or circular. For example, the storage container may be rectangular or triangular or polygonal, with components having different shapes as well.

Turning now to the figures, FIG. 1 illustrates a (rear or back) perspective view 100 of an underseat storage system with a light and a wheel guard 114, the storage system being attached to a seat post 112 component of a bicycle, according to various embodiments. The underseat storage system may include a container/container body 106 with a lid 108, and the lid 108 may include a light, such as, for example, a light emitting diode (LED) light. The combination 104 (i.e., container 106 with lid 108) is shown attached via a mounting bracket 110 to a bicycle seat post 112 (shown extending from a bicycle frame 118). A wheel guard (or fender) 114 is shown attached to the mounting bracket 110, between the mounting bracket 110 and the container body 106. The fender/wheel guard 114 extends rearward in an x-axis direction (as indicated by the x-y-z coordinate reference 120). The wheel guard 114 is shown above (i.e., at a z-axis distance above) a bicycle wheel 116. The mounting bracket 110, wheel guard 114, and (combination) container with lid 104 is shown positioned below (i.e., at a z-axis distance below) the bicycle seat 102 and substantially aligned with one another so that a centerline of the wheel guard 114, an axis of rotation of the (combination) container with lid 104 (where the axis of rotation is parallel with the x-axis), and a centerline of the mounting bracket 110 are aligned with a z-x plane (e.g., a vertical plane extending fore and aft (forward and rearward) between a front of the bicycle and the rear (or back) of the bicycle.

FIG. 2 is a side elevation exploded view 200 of an underseat storage system with light and wheel guard, according to various embodiments. As shown, a mounting bracket 110 may include a first clamp part 220 and a second clamp part 218 (which clamp around a frame or seat post). Tab release (or push button locking mechanism tab) 228 may be included, which may be urged rearward (i.e., outward from a rearward face 226 of the mounting bracket 110, in a direction parallel to the x-axis direction), by, for example, a spring, so as to extend rearward in the x-axis direction thereby extending a locking button into a gap (or space) 224 between the face 226 and the radial protrusions 222, 216. The locking button, when extending into the gap 224, may prevent relative rotation between mating components by preventing a protrusion formed in one of the mating components from rotatingly moving out of a received position where the protrusion is received into a pocket formed in the other one of the mating components. That is, the locking button may prevent counter rotation between mated components (such as, for example protrusions 216, 222 of the mounting bracket with either correspondingly sized and oriented pockets formed in the wheel guard or correspondingly sized and oriented pockets formed in the storage container).

The present inventor determined a mounting bracket as disclosed herein provides an aerodynamic and sleek design. In one embodiment, the mounting bracket (such as mounting bracket 110) is made (configured) for 27 mm to 35 mm seat posts. Other dimensions for diameter and length of seat posts (or frame components) may apply. In one embodiment, four M3 screws are used for securing a front clamping portion to a rear/back clamping portion of the mounting bracket, configured to clamp about a frame or seat post of a bicycle. One or more rubberized insert may be used between the clamping portions and the, for example, frame or seat post. The embodiments disclosed herein comprise mounting brackets having three radially extending (i.e., extending radially outward from an axis of rotation running along an x-axis direction) protrusions (with the protrusions extending radially within a plane parallel to a z-y plane, the z-y plane being orthogonal to the x-axis as shown in the coordinate reference 120). However, a different number of radially extending protrusions may be used. The radially extending protrusions and cooperatively sized and oriented pockets formed in a to-be-attached accessory, together, comprise correspondingly mating attachment structures that allows a user to easily secure the to-be-attached accessory to the mounting bracket. For example, the correspondingly mating attachment structures allow for easily securing a wheel guard and/or a storage container to the mounting bracket. An o-ring gasket may be used on the rearward face 226 for creating a locking function and also to reduce road noise and rattling. And the present inventor further determined that incorporating a locking feature such as the exemplary push button locking mechanism described herein, may be used to effectively lock the connection so that the connection between the mounting bracket and the to-be-attached accessory remains secure.

The wheel guard 114 may comprise radial protrusions 214 that are similar to or the same shape and size as the radially extending protrusions 216, 222 of the mounting bracket 110. The wheel guard 114 may comprise a hinge 212 that permits folding a rearward portion 210 toward a forward portion 208, thereby decreasing a length (as shown, along an x-axis direction) of the wheel guard (which may permit reduced sized product packaging for the wheel guard and/or other accessories and/or components of an underseat storage system.

The present inventor determined that the wheel guard drastically reduces water, dirt, and/or road debris from reaching a rider of the bicycle. A foldable wheel guard (or fender), an example of which is shown in FIG. 2, may be used for easy (and reduced space) storage of the accessory. The wheel guard may incorporate protrusions and pockets as described with respect to the mounting bracket and storage container such that the wheel guard may be attached to the mounting bracket alone, or the wheel guard may be further attached to a storage container (to achieve a configuration as shown in FIG. 1), or the wheel guard may be omitted (to achieve a configuration as shown in FIG. 3). When configured as shown in FIGS. 1 and 2, a user (or rider) is able to easily attach (and remove) a storage container (also referred to as a storage pod) to the wheel guard (that is, in turn, attached to the frame or seat post via the mounting bracket).

The storage container (without lid) (or storage pod) 106 may include a forward end cap (or puck) 206, a cylindrical or tube portion 202, and a rearward end ring 204. The puck 206 may be configured so as to connect with a wheel guard 114 or a mounting bracket 110. In the exemplary puck 206 illustrated in FIG. 2, pockets are formed in the forward facing end that receive the radially extending protrusions formed in the rearward facing end of the wheel guard 114 and the mounting bracket 110. The present inventor determined that the forward facing rounded edges of the puck 206 provides for improved aerodynamics, and anchor threads and/or annular recesses in the rearward facing portion of the puck 206 allows for creating a strong adhesive bond with the cylindrical tube portion 202 of the storage pod. Similarly, anchor threads and/or annular recesses in the forward facing portion of the ring 204 allows for creating a strong adhesive bod with the cylindrical tube portion 202 of the storage pod. The assembled storage pod 106 (comprising a puck 206, cylindrical tube 202, and ring 204) may be closed using a lid 108 to enclose an interior space inside the storage pod, with the storage pod and lid providing a water tight container for storing items of any kind. The present inventor determined the storage pod may be sized so as to accommodate, for example, a full tire tube replacement kit with (tire replacement) tools. The present inventor further determined that a streamlined, cylindrical design provides desirable aerodynamics, and use of carbon fiber materials for the cylindrical tube portion 202 provides desirable aesthetics and a futuristic appearance.

The lid 108 may include protrusions 230 and magnets 232. The protrusions 230 may comprise, for example, four radially outward extending protrusions that are sized and oriented to be received by four radially outward extending pockets (or grooves) formed in the ring 204. The radially extending protrusions and the cooperatively sized and oriented pockets comprise correspondingly mating attachment structures that allows a user to easily secure the lid 108 to the ring 204 of the storage pod. At least one magnet, such as magnets 232, may be used to provide what the present inventor determined to be a two-stage magnetic locking system. Magnets 232 may be incorporated into the lid 108 as shown in FIG. 2, that, coupled with suitably selected material that is attracted to a magnet incorporated into the ring 204, so as to urge the lid 108 toward the ring 204 (in, for example, an x-axis direction), and, thereafter, urge the lid 108 toward a rotatively locked position (with the rotatively locked position being locked with respect to rotation about an axis of rotation of the lid and ring, the axis of rotation being parallel to the x-axis direction). The one or more magnets may be positioned on the lid 108 and/or the ring 204. For example, the lid 108 may include several magnets, such as a pair of magnets for each radially extending protrusion. The ring 204 may also include several magnets, such as a pair of magnets for each radially extending pocket/receptacle.

The present inventor determined that the lid 108 may comprise a light emitting diode (LED) light on a rearward facing side and correspondingly mating bracket attachment structures on a forward facing side so as to permit attaching the lid 108 (with the lid 108 effectively functioning as a bicycle accessory comprising an LED light) directly to a mounting bracket (i.e., without either of the wheel guard 114 or storage pod 106). The LED light may comprise an automotive grade LED light/light system for maximum brightness and versatility. The LED light may comprise multiple ring (or ring shaped) angular focal prisms, such as a 3-ring lens/prism, to guide the light outward (from the rearward facing side of the lid 108) at zero, 45, and 90 degree angles. The lid 108 may comprise a push button switch (for example, positioned at the center of the rearward facing side of the lid 108) that provides push button activation of on/off and custom controls of the LED light.

The lid 108, container 106, wheel guard 114, and mounting bracket 110 may be aligned with one another (as shown in FIG. 2) for rotative relation to one another about an axis of rotation that is parallel to an x-axis direction, with the axis of rotation extending through each of the lid 108, container 106, wheel guard 114, and mounting bracket 110. The lid 108 may rotate about the axis of rotation so as to securably close over an opening in the storage container 106. The storage container (or storage pod) 106 may rotate about the axis of rotation such that pocket structures in the forward end (or puck) 206 of the storage pod 106 cooperatively engage with each of the protrusions 214 of a wheel guard 114. Similarly, the wheel guard 114 may rotate about the axis of rotation such that pocket structures in the forward portion of the wheel guard 114 cooperatively engage with each of the protrusions 216, 222 of a mounting bracket 110.

FIG. 3 is a side elevation view 300 of a (combination 104) container with lid 108 (or LED lid) closed over an otherwise open end of the container and attached to a mounting bracket 110, as an exemplary combination of accessory parts comprising an underseat storage system, according to embodiments. As shown in FIG. 3, the storage pod with lid (i.e., combination 104) is attached directly to a mounting bracket 110. The puck 206 has an x-axis dimension (or length) extending between front and back edges/ends 312 and 306, respectively, and a z-axis dimension (or diameter) at the back edge/end 306 that extends between bottom and top edges/surfaces 302 and 304, respectively. The cylindrical tube 202 extends between a front edge/end 306 and a rear edge/end 308, and has a diameter 302-304. The ring 204 has a diameter 302-304 and extends (along the x-axis direction) between a front edge/end 308 and a rear edge/end 310. And the lid 108 has a diameter (at its front edge/end) 302-304, and extends (along the x-axis direction) between a front edge/end 310 and a rear edge/end 314. Whereas the cylindrical tube 202 is shown oriented with an axis of rotation that is parallel to the x-axis and the connection between the mounting bracket and puck 206 is shown parallel to the y-z plane, the first clamp part 220 and second clamp part 218 are shown oriented to clamp about a frame or seat post that is offset 426 from 90 degrees (i.e., the z-axis direction).

FIGS. 4A, 4B, and 4C are front perspective 400, rear (or back) perspective 402, and rear (or back) elevation 404 views, respectively, of a mounting bracket/mounting bracket system, according to various embodiments. The first and second clamp parts, 220 and 218, respectively, are shown fastened to one another via screws 420, 422, 424. Four fasteners, or another number of fasteners, may be used, and the orientation of such fasteners may be other than as shown. For example, one or more fastener may be driven from one or the other of the first and/or second clamp parts 220, 218. The rearward face 418 of the mounting bracket may comprise radially outward extending protrusions such as protrusions 222, 406, and 408. The number of radial protrusions may be more or less than the three protrusions shown. Rotation 428 about the x-axis between the mounting bracket and a to-be-attached accessory (having suitably correspondingly mating attachment structures formed thereon for receiving each of the radial protrusions) may be prevented by a push button mechanism 412 whereby a button 416 extends in an x-axis direction (transverse or normal to the z-y plane) between adjacent radial protrusions. For example, the button 416 may extend from a hole 414 (in the rearward face 226) in the x-axis direction between a first radial protrusion 222 and a second radial protrusion 406. The button may be urged toward an outwardly extended position (or a rotation locking position) via a spring. A tab or release tab 410 is provided to permit a user to move the button 416 axially forward (i.e., in the x-axis direction toward the forward or front portion of the mounting bracket) to compress the spring and retract the button 416 into the hole 414.

FIG. 5 is a front perspective rear view 500 of a container with lid closed over an opening in the container, according to various embodiments. As shown, puck 206 comprises structures formed thereon and therewithin that correspondingly mate with structures formed on, for example, the mounting bracket 110. Puck 206 may comprise, as shown, a recessed surface 520 that is recessed by a distance along an x-axis direction as compared to the overhang (or overhanging/cantilevered) surfaces 506, 502, and 504 shown radially extending inward toward an axis of rotation of the puck 206 (the axis of rotation being parallel to and in the direction of the x-axis). The recessed surface 520 may be shaped and sized so as to receive each of the radially extending protrusions 222, 406, and 408 of the mounting bracket (as shown in FIGS. 4B and 4C) through correspondingly sized cutouts (or axial protrusion receiving cutouts) 512, 508, and 510, respectively. Each of the overhanging/cantilevered radial extensions 506, 502, and 504 may be formed so as to create pockets 516, 513, and 514, respectively, with each pocket sized and oriented so as to receive a respective radial extending protrusion 222, 406, and 408 of the mounting bracket, or of an accessory component (such as a wheel guard 114) having such correspondingly mating attachment structures formed thereon. Each pocket 516, 513, and 514 may be configured to accept a respective radial extending protrusion (such as protrusions 222, 406, and 408, respectively) in such a way that rotation of one or both of the pockets and protrusions cause each of the protrusions to radially move into a respective pocket as the two (pockets and protrusions) are rotated about the axis of rotation (or axis parallel to the x-axis) with respect to one another. For example, the radial protrusion 222 may enter toward the recessed surface 520 via cutout 512 as the radial protrusion 222 is moved axially in an x-axis direction toward the recessed surface 520 (and/or as the recessed surface 520 is moved axially in the x-axis direction toward the radial protrusion 222; thereafter, the radial protrusion 222 may enter the corresponding pocket 516 as the radial protrusion 222 rotates about the axis of rotation (or rotates 428 about the x-axis) (or as the pocket 516 rotates about the axis of rotation). Each pocket (such as pocket 516) may comprise material blocking further rotation of a protrusion within the pocket (such as protrusion 222 within the pocket 516) so that the protrusion is unable to rotate further in the same rotational direction enough to rotate (within a plane parallel to the y-z plane) to permit the protrusion to enter a region of the next adjacent cutout (such as cutout 508 that is, as shown in FIG. 5, adjacent to pocket 516 in a clockwise rotation about the axis of rotation). In this way, each of the pockets (formed in one component or accessory part) are configured so as to receive a respective protrusion (formed in the other component or accessory part) when the correspondingly mating attachments structures in each of the components or accessory parts are connected to one another.

FIGS. 6A and 6B are front elevation 600 and side elevation 602 views, respectively, of a front end closure (or puck 206) component of a container, according to embodiments. The puck 206 may have a circumference 604 that is the same as the cylindrical tube 202 portion of the storage pod. The pockets formed in the puck 206 may be referenced herein by referring to pockets 516, 513, and 514 as shown in FIG. 5, and/or by referring to the overhanging/cantilevered surfaces 506, 502, and 504 that (in an elevation view such as front elevation 600) hide the pockets 516, 513, and 514, respectively. Anchor threads and/or annular recesses 606 in the rearward facing portion of the puck 206 may extend in an x-axis direction between a puck exterior rear surface edge 612 and a rearward edge/end 610, which may allow for creating a strong adhesive bond with the cylindrical tube portion 202 of the storage pod.

Figures 7C, 7D:
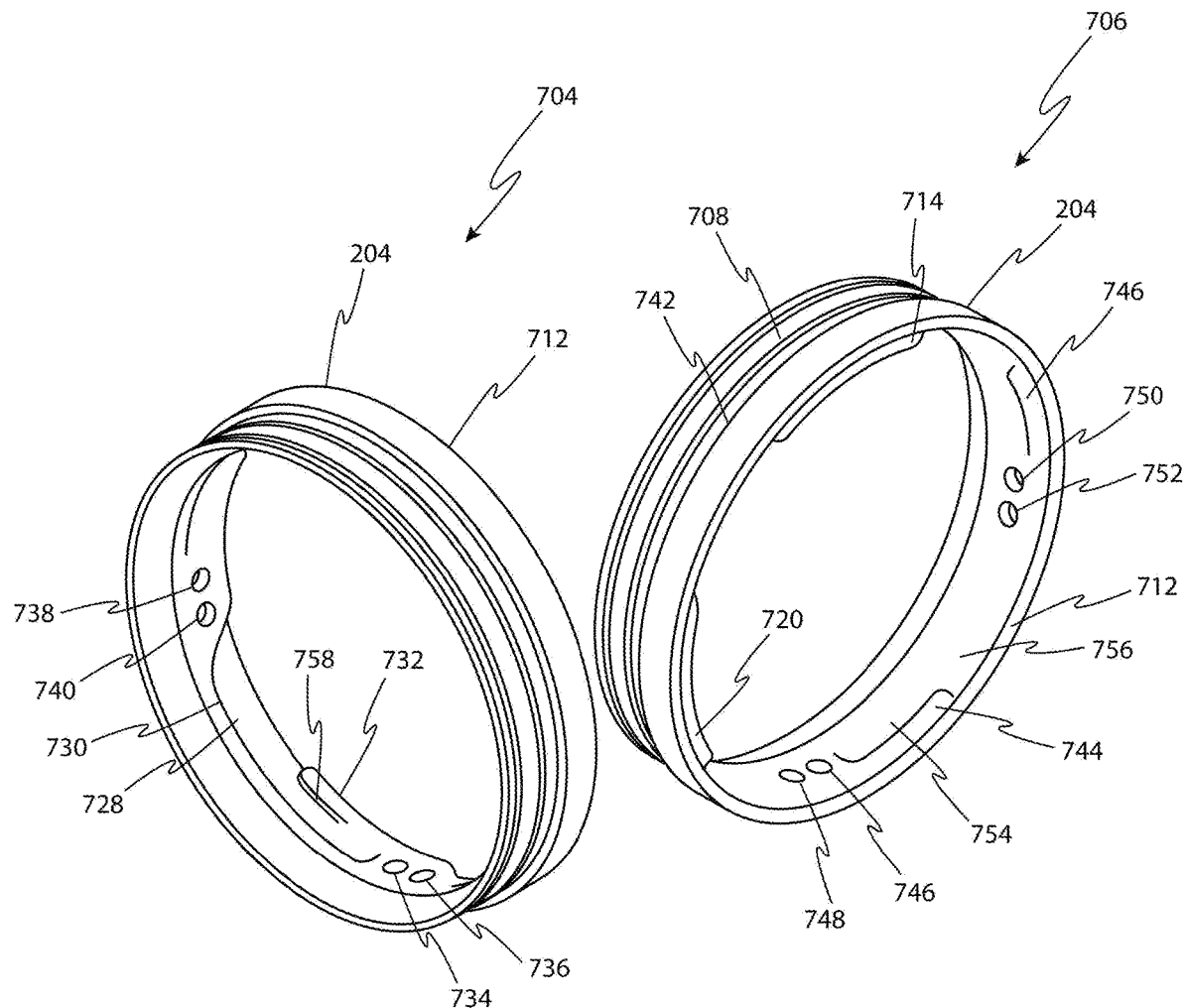
FIGS. 7C and 7D are front perspective and rear (or back) perspective views, respectively, of a rear/back (or ring) component of a container, according to embodiments.

FIGS. 7A and 7B are rear (or back) elevation 700 and side elevation 702 views, respectively, of a rear (or back) (or ring) component of a container or storage pod 106, according to embodiments. FIGS. 7C and 7D are front perspective 704 and rear (or back) perspective 706 views, respectively, of a rear/back (or ring) 204 component of a container, according to embodiments. Anchor threads and/or annular recesses 708 in a forward facing portion of the ring 204 may extend in an x-axis direction between a ring exterior front surface edge 742 and a forward edge/end 710, which may allow for creating a strong adhesive bond with the cylindrical tube portion 202 of the storage pod. Portions of the rearward most/rear facing edge 712 of the ring 204 may comprise overhang portions (such as overhang portions 714, 720, 716, 718) and corresponding grooves (such as grooves 722, 726, 724) positioned about the circumference of the rear facing edge 712. Each of the grooves may lead into corresponding pockets extending radially outward from an axis of rotation parallel to an x-axis direction (as shown in FIG. 7A), with each radially extending pocket hidden in the rear elevation view 700 by an overhanging/cantilevering portion (such as overhang portions 714, 720, 716, 718). The ring 204 may comprise four radially outward extending pockets, each hidden beneath overhanging portions (such as overhand portions 714, 720, 716, 718) when viewed as shown in FIG. 7A.

As shown in FIG. 7C, a radially outward extending pocket formed within the ring 204 may comprise, for example, a rearmost overhang surface 732 having an underside surface 758, whereby the pocket comprises a radially extending recess below the underside surface 758 that extends circumferentially from a groove surface 730 that extends radially inward from a groove channel wall 728. The circumferential groove length may be sized so that a correspondingly sized and oriented radially outward extending protrusion (for example, on a lid 108) may be received into the groove when the protrusion moves axially in a direction parallel to the x-axis toward the ring 204. The groove surface 730 may prevent the protrusion from further forward axial motion toward the ring 204, whereafter the protrusion may move (via rotation about the axis of rotation) into the pocket area formed between the groove surface 730 and the underside surface 758. As shown in FIG. 7C, the pocket may be sized in circumferential length so as to permit a correspondingly sized protrusion to axially enter the groove area, then move via relative rotation between the ring 204 and the protrusion about the axis of rotation into one pocket. Magnets (or metal attracted to magnets) 736, 734 may be positioned at a circumferential end of each pocket and configured so as to provide a rotational lock with cooperatively acting magnets and/or metal attracted to magnets positioned on, for example, a lid 108 having radially outward extending protrusions formed thereon. For example, magnets or metal attracted to magnets 736, 734 may be positioned, as shown in FIG. 7C, so as to pull-in the lid 108 toward the ring 204; and with rotation of the protrusion so as to be received into the corresponding pocket, the magnets or metal attracted to magnets 736, 734 may be positioned to prevent back rotation of the protrusion. Further magnets or metal attracted to magnets 740, 738 may be positioned proximate to a circumferentially adjacent pocket. As shown in FIG. 7D, an overhang 746 is positioned over a radially outward extending pocket with magnets or metal attracted to magnets 750, 752 positioned circumferentially at an end of a pocket under the overhang 746. Likewise, overhang 744 is positioned over a radially outward extending pocket with magnets or metal attracted to magnets 746, 748 positioned circumferentially at an end of a pocket under the overhang 744. The wall channel surface of a groove extends axially from the rear surface 712 of the ring axially forward and then under the pocket overhang. For example, as depicted in FIG. 7D the groove wall channel surface at reference 756 may be radially positioned relative to the axis of rotation of the ring 204 as the wall channel surface within the pocket at reference 754.

FIGS. 8A, 8B, 8C, and 9A are rear (or back) perspective 800, front perspective 802, rear (or back) elevation 804, and front elevation 900 views, respectively, of a container cover (or lid, or LED lid), according to various embodiments. FIG. 9B is a side elevation view of a container cover (or lid, or LED lid) without a transparent outer/rearward cover thereof, according to various embodiments. The lid 108 may comprise a light emitting diode (LED) light 816, and the lid in having an LED light may be referred to as an LED lid 108. The LED may comprise one or more ring-shaped LED's, and a control button may be included, such as button 808 positioned within a button area 908. The LED lid 108 may comprise battery storage, circuitry for driving the one or more LED's, circuitry for controlling function and operation (i.e., on/off/function selection) of the LED's, and may further include circuitry and electrical elements needed for recharging of the battery storage. A forward side 822 of the LED lid 108 may comprise, for example, access to battery storage and/or an electrical connection point for recharging a battery. The LED lid 108 may further include circuitry for inductive recharging of a battery/battery storage. The LED 816 may comprise more than one ring shaped LED element, and may comprise more than one LED lens or prism. For example, three different prisms may be included so as to provide a wide range of light projection. One lens/prism may focus light narrowly, for example at zero degrees away from an axial projection in a direction parallel to the x-axis. A second lens/prism may focus light at 45 degrees from the x-axis direction (away from a rear facing surface of the LED lid 108). And a third lens/prism may focus light at 90 degrees from the x-axis direction, which is to say the light is thereby projected radially outward in directions parallel to a y-z plane. A transparent over cover 806 may be included, for protecting the LED components from weather, road debris, and the like.

The lid 108 may include radially outward extending protrusions, such as protrusions 230, 824, 904, and 912 extending radially outward from a circumference 820 that are sized and oriented to be received into the grooves and pockets described above with respect to ring 204. Together, the protrusions and pockets comprise correspondingly mating lid attachment structures, with a first portion of the correspondingly mating lid attachment structures comprising the protrusions and a second portion of the correspondingly mating lid attachment structures comprising the pockets. For example, each of the protrusions 230, 824, 904, and 912 formed on the lid 108 may be sized and oriented to be received into a respective groove and pocket formed on the ring 204. The protrusion 904 formed on the lid 108, for example, may be configured to be received into the groove 724 formed in the ring 204 (via bringing the lid 108 and ring 204 together in an axial motion in an x-axis direction with respect to one another), and then (via relative rotation between the lid 108 and ring 204) the protrusion may be received into the pocket in the ring 204 formed with the overhang 716. With the protrusion 904 received into the pocket formed with overhang 716, the overhang portion may be oriented so as to occupy a space 906 (as shown in FIG. 9B) created by the radial difference between radially outward extending protrusion 904 and a lid surface 910 from which the radially outward protrusion 904 extends.

The lid 108 may include, as shown in FIGS. 8A and 8B, magnets and/or metal attracted to magnets 812, 810, 232, 814. The magnets and/or metal attracted to magnets described herein, such as those referenced using reference numerals 812, 810, 232, 814 (in FIGS. 8A and 8B) and 750, 752, 746, 748, 736, 734, 738, 740 (in FIGS. 7C and 7D) may comprise magnets or a combination of magnets and metal attracted to magnets. For example, the lid 108 may comprise magnets 812, 810, 232, 814, while the ring 204 may comprise metal (of a type attracted to magnets) 750, 752, 746, 748, 736, 734, 738, 740. The correspondingly mating lid attachment structures may include at least one anti-rotation magnet (such as, for example, any one or combination of the aforementioned magnets) configured to urge the lid 108 into a rotationally locked position when the protrusions are positioned within respective pockets, and to provide a user with haptic feedback (such as, for example, a tactile feel/stop/thump as the rotationally locked position is reached) and/or audible feedback (such as, for example, an audible click sound) as the user rotates the lid into the rotationally locked position. The correspondingly mating lid attachment structures may include at least one pull-in magnet (such as, for example, any one or combination of the aforementioned magnets) configured to urge the lid toward the container body and to provide a user haptic feedback (such as, for example, a tactile feel/stop/thump as the lid 108 and ring 204 are brought together to one another) and/or audible feedback (such as, for example, an audible click sound) as the user positions the lid proximate to the container body, whereafter the lid 108 is rotatable into a rotationally locked position.

FIG. 9A further illustrates an exemplary embodiment whereby a forward facing side of the lid 108 (i.e., the forward facing side is facing into the interior space of the container or storage pod and opposite the side facing rearward) may include correspondingly mating bracket attachment structures formed therein so as to permit attaching the lid to a mounting bracket. As shown in FIG. 9A, the correspondingly mating bracket attachment structures may comprise the pockets and recessed surfaces and features as described with respect to FIGS. 5 and 6A. The overhanging/cantilevered surfaces 930, 932, and 928 are formed similar to and function the same as described for the overhanging/cantilevered surfaces 506, 502, and 504 (in FIGS. 5 and 6A). The overhanging/cantilevered surfaces 930, 932, and 928 (as shown in the elevation view 900) hide respective pockets as do the overhanging/cantilevered surfaces 506, 502, and 504 in FIG. 6A. The hidden pockets corresponding to overhanging/cantilevered surfaces 930, 932, and 928 are as described for pockets 516, 513, and 514, respectively.

Figure 10:
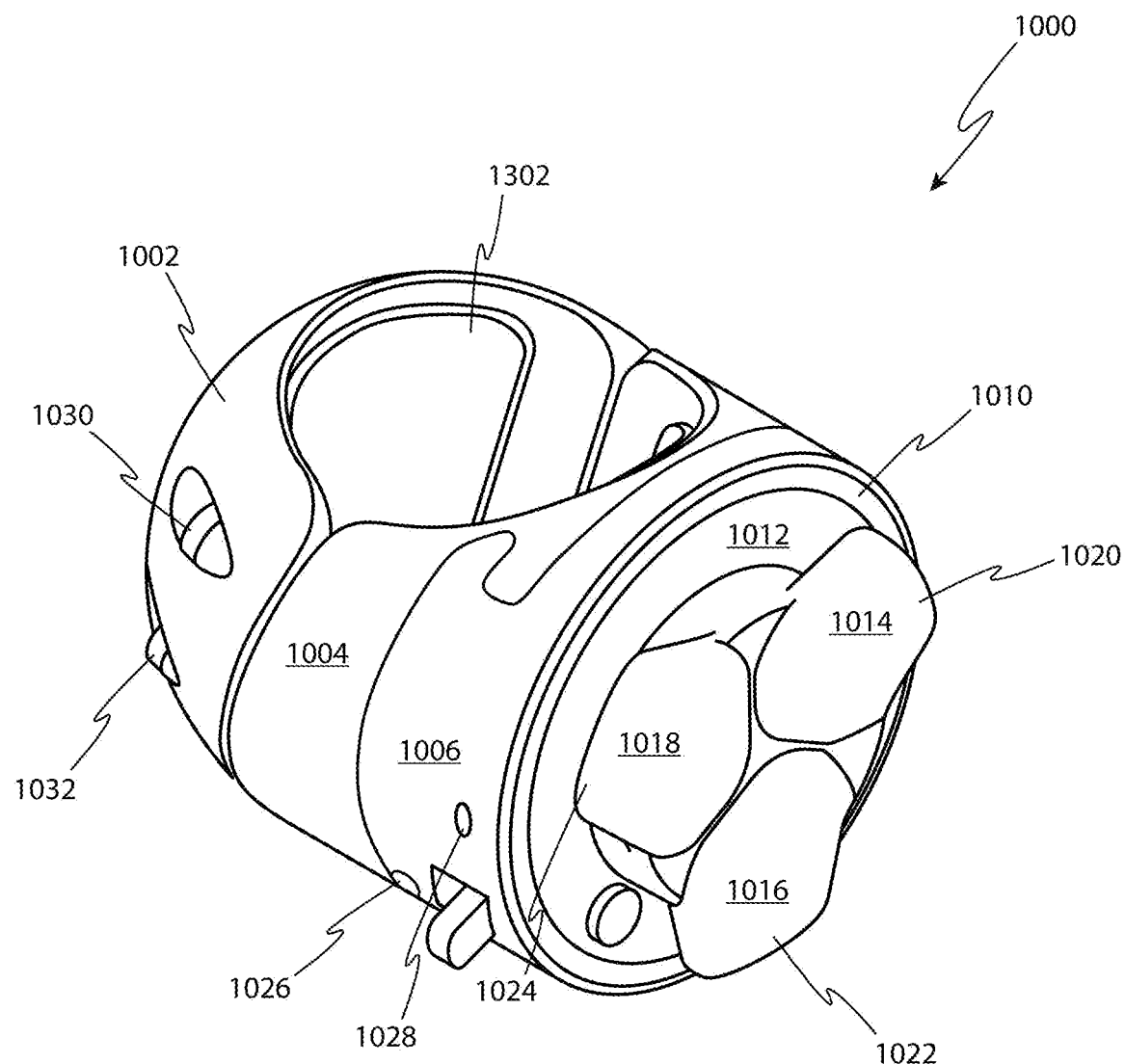
FIG. 10 is a rear (or back) perspective view of a mounting bracket/mounting bracket system having additional adjustment capabilities and function, according to various embodiments.

FIG. 10 is a rear (or back) perspective view 1000 of a mounting bracket/mounting bracket system having additional adjustment capabilities and function, according to various embodiments. As shown, the mounting bracket includes a front clamping part 1002, a middle portion (or back clamping part) 1004, and a rear (or rearward) portion 1006. A rubberized or plastic insert 1008 may be used for improved gripping of a bicycle frame or seat post extending therethrough. Fasteners such as screws 1030, 1032 may be used to connect the front and back clamping parts (e.g., about a frame or a seat post). A rubberized or polymer or plastic o-ring/seal 1010 may be incorporated into a rearward face 1012 of the mounting bracket (or of the rear portion 1006 of the mounting bracket), the o-ring/seal 1010 sized and configured to project rearward from the rearward face 1012 so as to increase stability of the connection between the mounting bracket and an accessory such as a storage pod 106 and/or wheel guard 114. Rearmost surfaces of the mounting bracket may comprise rearward surfaces 1014, 1018, and 1016 associated with the radially extending protrusions 1020, 1024, and 1022, respectively. In the embodiment shown in FIG. 10, a rail is formed in the middle portion/back clamp part 1004, the rail having a generally T-shape when viewed from above, looking downward in a z-axis direction. The rail is configured to move substantially within a plane parallel with the z-x plane, within a guide formed in the rear portion 1006. A bolt (or screw) 1026 may be used to secure the position of the rear portion 1006 with respect to the middle portion 1004. A pin may extend through hole 1028 that anchors a lever extending through the rear portion, the lever being part of a tab release and button/push button locking mechanism. The tab release and button/push button locking mechanism may be configured differently than shown in FIGS. 10-13. For example, a button locking mechanism as previously described with respect to FIGS. 2, 4A, 4B, and 4C may be used. Still other alternatives may be used. For example, a lever may be used to urge a button outward from the rearward face 1012, and that relies on a spring effect of the lever material to urge the button outward to provide the rotational locking function described. As another example, a spring may be used to urge the button outward, with a tab release extending radially outward from the rear portion 1006.

Although FIGS. 10-13 show the rear portion 1006 having a guide (or track) formed therein, within which a T-shaped rail formed in the middle portion 1004 may be slidably connected, the rail may alternatively be formed in the rear portion 1006 with the guide formed in the middle portion/back clamp part 1004. In such alternative, a bolt may extend through the middle portion 1004 (as opposed to the rear portion) so as to positionally secure the rear portion with respect to the middle portion. The bolt may, in any embodiments, operate by squeezing the edges of the guide together so as to frictionally secure a position of the rear portion 1006 with respect to the middle portion 1004.

Figure 11:
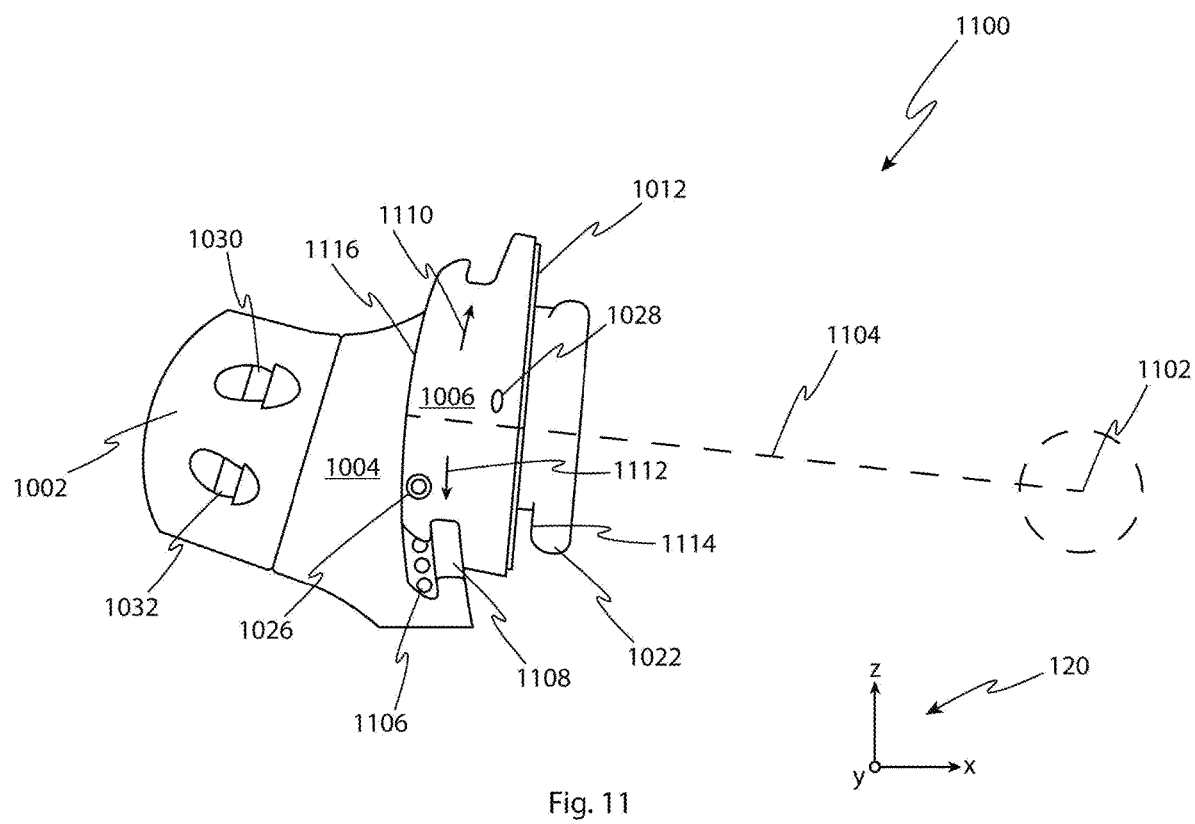
FIG. 11 is a side elevation view and diagram showing additional adjustment capabilities and function of a mounting bracket/mounting bracket system, according to various embodiments.

FIG. 11 is a side elevation view and diagram 1100 showing additional adjustment capabilities and function of a mounting bracket/mounting bracket system, according to various embodiments. As shown in FIG. 11, the mounting bracket body comprises an rearward portion 1006 positioned adjacent to a middle portion 1004 portion. The middle portion 1004 connects to a front clamping part 1002, with the front clamping part 1002 and the front part of the middle portion 1004 configured to attach to a bicycle frame or a bicycle seat post. The rear portion 1006, as shown, includes radially extending protrusions that function as described with regard to mounting bracket 110. The rear portion 1006 further includes an adjustment rail configured to permit moving the radially extending protrusions, with respect to the middle portion 1004, upward 1110 and downward 1112 along an arcuate path 1116 that is parallel to the z-x plane (with respect to the coordinate reference 120 as used in FIG.

2) and about a pivot axis 1102 that is parallel to the y-axis direction, thereby permitting adjustment of an alignment between the middle and rear portions of the mounting bracket. The arcuate path 1116 has a radius 1104, the radius 1104 being the distance between the arcuate path 1116 and the pivot axis 1102. A bolt 1026 may be used to set/fix/secure the position of the rear portion 1006 with respect to the middle portion 1004. The bolt 1026 may use one of a number of holes 1106 to adjust the positon of the rear portion upward 1110 or downward 1112 along a track/rail 1108.

Figure 12:
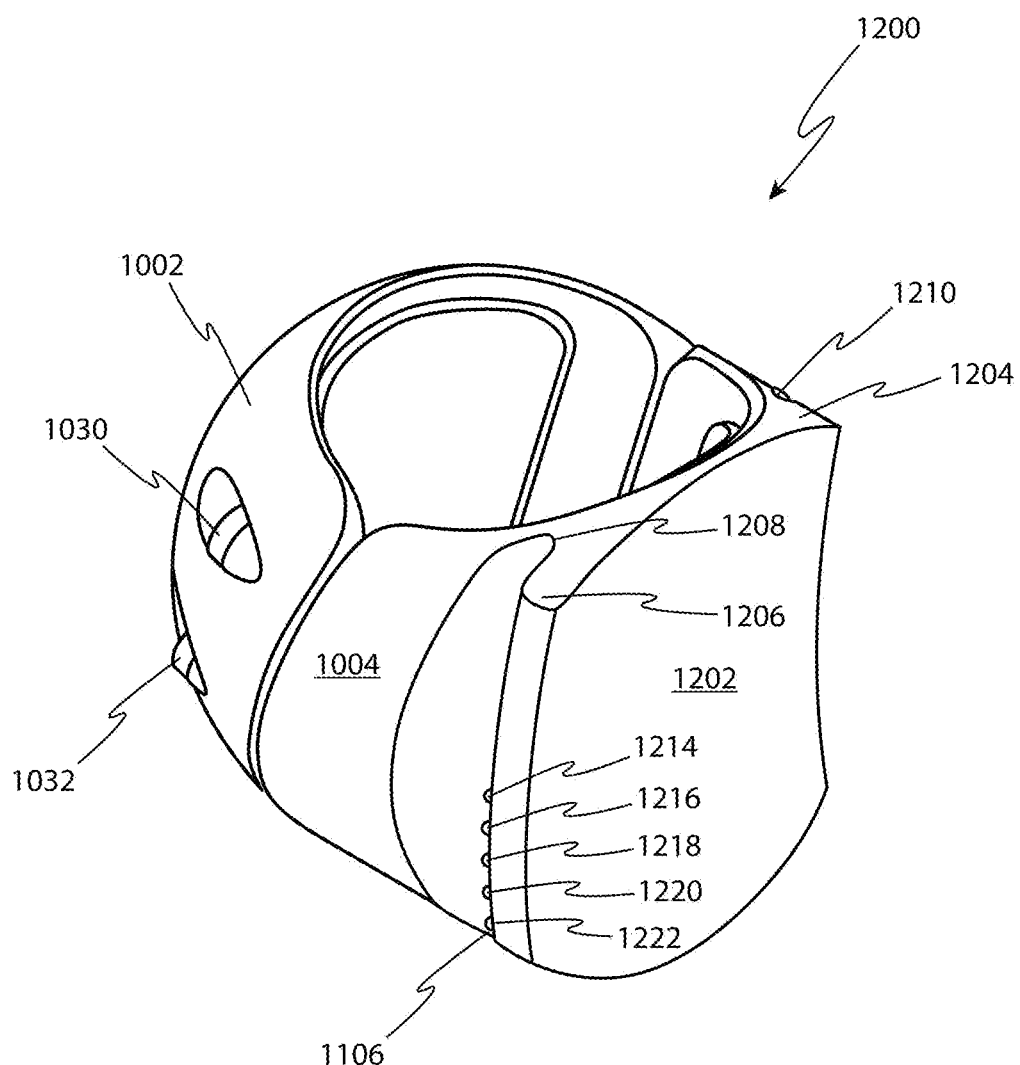
FIG. 12 is a rear (or back) perspective view of a forward portion of a mounting bracket having front and back clamping parts, and revealing rail and other features formed in the back clamping part of the forward portion of the mounting bracket, according to various embodiments.

FIG. 12 is a rear (or back) perspective view 1200 of a forward portion of a mounting bracket having front and back clamping parts, 1002 and 1004, respectively, and revealing a rail having a rearward surface 1202, narrow inward edges 1208 and 1210, and outward edges 1206 and 1204. The rearward surface 1202 comprises what may be referred to as a top part of a letter "T" in a T-shaped rail structure. The narrow inward edges 1208 and 1210 comprise what may be referred to as the lower part of a letter "T" in a T-shaped rail structure. And the outward edges 1206 and 1204 comprise what may be referred to as the outward ends of the top part of the letter "T", in a T-shaped rail structure. The holes 1214, 1216, 1218, 1220, and 1222 provide adjustment locations for setting a relative position between the middle portion 1004 and the rear portion 1006. Alternatively, the holes may comprise a slot extending from hole 1214 to hole 1222, with the bolt 1026 configured so as to tighten and squeeze together sides of a track or guide formed within the rearward portion 1006, thereby gripping the T-shaped rail formed in the middle portion 1004.

Figure 13:
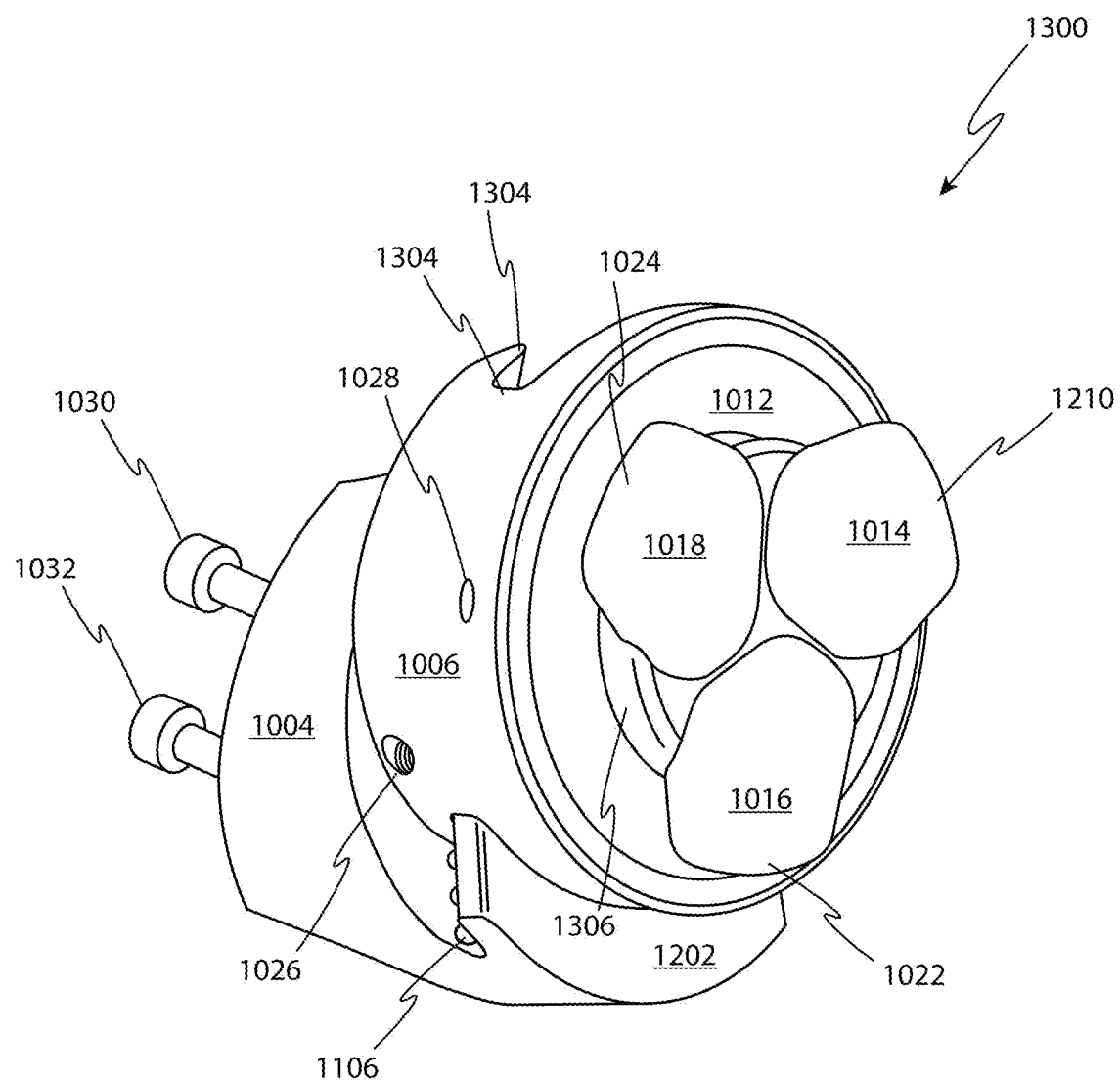
FIG. 13 is a rear (or back) perspective view of a rearward portion of a mounting bracket slidably engaged with a forward portion of a mounting bracket, according to various embodiments.

FIG. 13 is a rear (or back) perspective view 1300 of a rearward portion 1006 of a mounting bracket slidably engaged with a middle portion 1004 of a mounting bracket, according to various embodiments. As described and discussed above, a bolt 1026 may extend through the rear portion 1006 so as tighten and squeeze together sides (such as a side that include a rail track/guide inward portion 1302 that extends from an outward portion 1304) to positionally secure the rear portion 1006 with respect to the middle portion 1004.

Also shown in FIG. 13 is a different aesthetic appearance of the radially outward extending protrusions than shown in, for example, FIGS. 4B and 4C. The radially outward extending protrusion 1020, 1022, and 1024 shown in FIG. 13 are each associated with corresponding portions of the rearmost surfaces 1014, 1016, and 1018, respectively. In contrast, the radially outward extending protrusions 222, 406, and 408, as shown in FIGS. 4B and 4C, are each associated with a continuous rearmost surface 418. The protrusions in each of the embodiments described herein, comprise protrusions extending radially outward from an axis of rotation parallel to an x-axis direction, with the protrusions extending parallel to a y-z plane (that is orthogonal to the x-axis direction), and with each of the protrusions extending away from a rearward face 1012 of the mounting bracket by at least part of an x-axis distance within which a radially inward portion 1306 of the mounting bracket connects the rearward face 1012 with the protrusions extending radially outward.

FIGS. 1, 3, 4A, 4B, 4C, 5, and 10-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of the element may be referred to as a "top" of the component and a bottommost element or point of the element may be referred to as a "bottom" of the component, in at least one example. As used herein, top/bottom, upper/lower, above/below, may be relative to a vertical axis of the figures and used to describe the positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Certain adaptations and modifications of the described embodiments can be made. Therefore, the above-discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise' and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability maybe plus 10% or negative 10% of the particular number specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through the presentation of new claims in this or a related application. Such claims, whether broader, narrower, equal, or different in scope to the original claims, also are regarded as included within the subject matter of the present disclosure.

What is claimed is:

1. A bicycle storage accessory, the accessory comprising:
a container body defining an interior space therewithin;
a lid configured to cover an opening in the container body so as to enclose the interior space;
a mounting bracket configured to securably attach to a component of a bicycle; and
correspondingly mating bracket attachment structures on each of the container body and the mounting bracket, the correspondingly mating bracket attachment structures comprising a first portion formed on the container body or the mounting bracket and having a plurality of protrusions extending radially, parallel to a z-y plane, about an axis of rotation running along an x-axis direction, the correspondingly mating bracket attachment structures comprising a second portion formed on an opposite one of the container body and the mounting bracket and having a plurality of pockets extending radially, parallel to the z-y plane, about the axis of rotation running along the x-axis direction, and the correspondingly mating bracket attachment structures configured so as to permit the container body to be fixedly secured to the mounting bracket by, first, moving the container body and the mounting bracket toward one another so that the first portion of the correspondingly mating bracket attachment structures is received by the second portion of the correspondingly mating bracket attachment structures, and, second, rotating the first and/or second portions of the correspondingly mating bracket attachment structures about the x-axis with respect to one another such that each of the plurality of protrusions of the first portion of the correspondingly mating bracket attachment structures are received into respective ones of the plurality of pockets of the second portion of the correspondingly mating bracket attachment structures, wherein the plurality of protrusions extending radially, parallel to the z-y plane, about the axis of rotation running along the x-axis direction, comprises three or more protrusions, and wherein a push button locking mechanism is positioned between a pair of adjacent ones of the three protrusions, the push button locking mechanism having a button urged so as to extend parallel to the x-axis direction and configured to prevent rotational movement between the container body and the mounting bracket when the protrusions of the correspondingly mating bracket attachment structures are positioned within respective ones of the plurality of pockets of the correspondingly mating bracket attachment structure.

2. The accessory of claim 1, further comprising correspondingly mating lid attachment structures on each of the container body and the lid, the correspondingly mating lid attachment structures comprising a first portion formed on the container body or the lid and having a plurality of protrusions extending radially, parallel to a z-y plane, about an axis of rotation running along an x-axis direction, the correspondingly mating lid attachment structures comprising a second portion formed on an opposite one of the container body and the lid and having a plurality of pockets extending radially, parallel to the z-y plane, about the axis of rotation running along the x-axis direction, and the correspondingly mating lid attachment structures configured so as to permit the lid to be fixedly secured to the container body by, first, moving the container body and the lid toward one another so that the first portion of the correspondingly mating lid attachment structures is received by the second portion of the correspondingly mating lid attachment structures, and, second, rotating the first and/or second portions of the correspondingly mating lid attachment structures about the x-axis with respect to one another such that each of the plurality of protrusions of the first portion of the correspondingly mating lid attachment structures are received into respective ones of the plurality of pockets of the second portion of the correspondingly mating lid attachment structures.

3. The accessory of claim 2, wherein the correspondingly mating lid attachment structures include at least one anti-rotation magnet configured to urge the lid into a rotationally locked position whereby the first portion of the correspondingly mating lid attachment structures are positioned within respective ones of the plurality of pockets of the second portion of the correspondingly mating lid attachment structures and to provide a user haptic feedback and/or audible feedback as the user rotates the lid into the rotationally locked position.

4. The accessory of claim 3, wherein the correspondingly mating lid attachment structures include at least one pull-in magnet configured to urge the lid toward the container body and to provide a user haptic feedback and/or audible feedback as the user positions the lid proximate to the container body, whereafter the lid is rotatable into the rotationally locked position.

5. The accessory of claim 1, further comprising a wheel guard configured to permit connecting the wheel guard to the mounting bracket and connecting the container body to the wheel guard, the wheel guard comprising correspondingly mating wheel guard attachment structures on each of two oppositely facing sides of the wheel guard, the correspondingly mating wheel guard attachment structures comprising a first portion formed on a first side facing the mounting bracket or a second side facing the container body and having a plurality of protrusions extending radially, parallel to a z-y plane, about an axis of rotation running along an x-axis direction, the correspondingly mating wheel guard attachment structures comprising a second portion formed on an opposite one of the first side facing the mounting bracket and the second side facing the container body and having a plurality of pockets extending radially, parallel to the z-y plane, about the axis of rotation running along the x-axis direction, and the correspondingly mating wheel guard attachment structures configured so as to permit the wheel guard to be fixedly secured to the mounting bracket by, first, moving the wheel guard and the mounting bracket toward one another, and, second, rotating the wheel guard and the mounting bracket with respect to one another such that the correspondingly mating wheel guard attachment structures engage with the mounting bracket so as to secure the wheel guard to the mounting bracket.

6. The accessory of claim 1, wherein the lid comprises a light emitting diode (LED) light.

7. The accessory of claim 1, wherein the mounting bracket is configured to attach to a bicycle frame or a bicycle seat post.

8. A bicycle storage accessory mounting bracket, the mounting bracket comprising:
a mounting bracket body configured to securably attach to a component of a bicycle; and
correspondingly mating bracket attachment structures on each of the mounting bracket body and an accessory-to-be attached to the bicycle via the mounting bracket body, the correspondingly mating bracket attachment structures comprising a first portion formed on the accessory-to-be attached or the mounting bracket body and having a plurality of protrusions extending radially, parallel to a z-y plane, about an axis of rotation running along an x-axis direction, the correspondingly mating bracket attachment structures comprising a second portion formed on an opposite one of the accessory-to-be attached and the mounting bracket body and having a plurality of pockets extending radially, parallel to the z-y plane, about the axis of rotation running along the x-axis direction, and the correspondingly mating bracket attachment structures configured so as to permit the accessory-to-be attached to be fixedly secured to the mounting bracket body by, first, moving the accessory-to-be attached and the mounting bracket body toward one another so that the first portion of the correspondingly mating bracket attachment structures is received by the second portion of the correspondingly mating bracket attachment structures, and, second, rotating the first and/or second portions of the correspondingly mating bracket attachment structures about the x-axis with respect to one another such that each of the plurality of protrusions of the first portion of the correspondingly mating bracket attachment structures are received into respective ones of the plurality of pockets of the second portion of the correspondingly mating bracket attachment structures, wherein the accessory-to-be attached comprises a wheel guard configured to permit connecting the wheel guard to the mounting bracket body and connecting the container body to the wheel guard, the wheel guard comprising correspondingly mating wheel guard attachment structures on each of two oppositely facing sides of the wheel guard, the correspondingly mating wheel guard attachment structures comprising a first portion formed on a first side facing the mounting bracket body or a second side facing the container body and having a plurality of protrusions extending radially, parallel to the z-y plane, about the axis of rotation running along the x-axis direction, the correspondingly mating wheel guard attachment structures comprising a second portion formed on an opposite one of the first side facing the mounting bracket body and the second side facing the container body and having a plurality of pockets extending radially, parallel to the z-y plane, about the axis of rotation running along the x-axis direction, and the correspondingly mating wheel guard attachment structures configured so as to permit the wheel guard to be fixedly secured to the mounting bracket body by, first, moving the wheel guard and the mounting bracket body toward one another, and, second, rotating the wheel guard and the mounting bracket body with respect to one another such that the correspondingly mating wheel guard attachment structures engage with the mounting bracket body so as to secure the wheel guard to the mounting bracket body.

9. The mounting bracket of claim 8, wherein the accessory-to-be attached comprises:
a cylindrically shaped container body defining an interior space therewithin;
a lid configured to cover an opening in the container body so as to enclose the interior space, the lid comprising a light emitting diode (LED) light; and
correspondingly mating lid attachment structures on each of the container body and the lid, the correspondingly mating lid attachment structures comprising a first portion formed on the container body or the lid and having a plurality of protrusions extending radially, parallel to the z-y plane, about the axis of rotation running along the x-axis direction, the correspondingly mating lid attachment structures comprising a second portion formed on an opposite one of the container body and the lid and having a plurality of pockets extending radially, parallel to the z-y plane, about the axis of rotation running along the x-axis direction, and the correspondingly mating lid attachment structures configured so as to permit the lid to be fixedly secured to the container body by, first, moving the container body and the lid toward one another so that the first portion of the correspondingly mating lid attachment structures is received by the second portion of the correspondingly mating lid attachment structures, and, second, rotating the first and/or second portions of the correspondingly mating lid attachment structures about the x-axis with respect to one another such that each of the plurality of protrusions of the first portion of the correspondingly mating lid attachment structures are received into respective ones of the plurality of pockets of the second portion of the correspondingly mating lid attachment structures.

10. The mounting bracket of claim 9, wherein the correspondingly mating lid attachment structures include at least one anti-rotation magnet configured to urge the lid into a rotationally locked position whereby the first portion of the correspondingly mating lid attachment structures are positioned within respective ones of the plurality of pockets of the second portion of the correspondingly mating lid attachment structures and to provide a user haptic feedback and/or audible feedback as the user rotates the lid into the rotationally locked position, and wherein the correspondingly mating lid attachment structures include at least one pull-in magnet configured to urge the lid toward the container body and to provide a user haptic feedback and/or audible feedback as the user positions the lid proximate to the container body, whereafter the lid is rotatable into the rotationally locked position.

11. The mounting bracket of claim 8, wherein the plurality of protrusions extending radially, parallel to the z-y plane, about the axis of rotation running along the x-axis direction, comprises three or more protrusions, and wherein a push button locking mechanism is positioned between a pair of adjacent ones of the three protrusions, the push button locking mechanism having a button urged so as to extend parallel to the x-axis direction and configured to prevent rotational movement between the container body and the mounting bracket body when the protrusions of the correspondingly mating bracket attachment structures are positioned within respective ones of the plurality of pockets of the correspondingly mating bracket attachment structure.

12. The mounting bracket of claim 8, wherein the mounting bracket body is configured to attach to a bicycle frame or a bicycle seat post, and wherein the accessory-to-be attached comprises a light emitting diode (LED) light configured to permit connecting the LED light to the mounting bracket body.

13. The mounting bracket of claim 12, wherein the mounting bracket body comprises an rearward portion positioned adjacent to an forward portion, the forward portion configured to attach to the bicycle frame or the bicycle seat post, and the rearward portion having the first or second portion of the correspondingly mating bracket attachment structures formed thereon and having an adjustment rail configured to permit moving the first or second portion of the correspondingly mating bracket attachment structures, with respect to the forward portion, upward and downward along an arcuate path that is parallel to the z-x plane and about a pivot axis that is parallel to the y-axis direction, thereby permitting adjustment of an alignment between the forward and rearward portions of the mounting bracket body.

14. The mounting bracket of claim 13, wherein the mounting bracket body includes a locking bolt configured to securely fix a position of the rearward portion in relation to the forward portion.

15. A bicycle storage accessory mounting bracket, the mounting bracket comprising:
a mounting bracket body configured to securably attach to a component of a bicycle; and
correspondingly mating bracket attachment structures on each of the mounting bracket body and an accessory-to-be attached to the bicycle via the mounting bracket body, the correspondingly mating bracket attachment structures comprising a first portion formed on the accessory-to-be attached or the mounting bracket body and having a plurality of protrusions extending radially, parallel to a z-y plane, about an axis of rotation running along an x-axis direction, the correspondingly mating bracket attachment structures comprising a second portion formed on an opposite one of the accessory-to-be attached and the mounting bracket body and having a plurality of pockets extending radially, parallel to the z-y plane, about the axis of rotation running along the x-axis direction, and the correspondingly mating bracket attachment structures configured so as to permit the accessory-to-be attached to be fixedly secured to the mounting bracket body by, first, moving the accessory-to-be attached and the mounting bracket body toward one another so that the first portion of the correspondingly mating bracket attachment structures is received by the second portion of the correspondingly mating bracket attachment structures, and, second, rotating the first and/or second portions of the correspondingly mating bracket attachment structures about the x-axis with respect to one another such that each of the plurality of protrusions of the first portion of the correspondingly mating bracket attachment structures are received into respective ones of the plurality of pockets of the second portion of the correspondingly mating bracket attachment structures, wherein the plurality of protrusions extending radially, parallel to the z-y plane, about the axis of rotation running along the x-axis direction, comprises three or more protrusions, and wherein a push button locking mechanism is positioned between a pair of adjacent ones of the three protrusions, the push button locking mechanism having a button urged so as to extend parallel to the x-axis direction and configured to prevent rotational movement between the container body and the mounting bracket body when the protrusions of the correspondingly mating bracket attachment structures are positioned within respective ones of the plurality of pockets of the correspondingly mating bracket attachment structure.

16. The mounting bracket of claim 15, wherein the accessory-to-be attached comprises:
a cylindrically shaped container body defining an interior space therewithin;
a lid configured to cover an opening in the container body so as to enclose the interior space, the lid comprising a light emitting diode (LED) light; and
correspondingly mating lid attachment structures on each of the container body and the lid, the correspondingly mating lid attachment structures comprising a first portion formed on the container body or the lid and having a plurality of protrusions extending radially, parallel to the z-y plane, about the axis of rotation running along the x-axis direction, the correspondingly mating lid attachment structures comprising a second portion formed on an opposite one of the container body and the lid and having a plurality of pockets extending radially, parallel to the z-y plane, about the axis of rotation running along the x-axis direction, and the correspondingly mating lid attachment structures configured so as to permit the lid to be fixedly secured to the container body by, first, moving the container body and the lid toward one another so that the first portion of the correspondingly mating lid attachment structures is received by the second portion of the correspondingly mating lid attachment structures, and, second, rotating the first and/or second portions of the correspondingly mating lid attachment structures about the x-axis with respect to one another such that each of the plurality of protrusions of the first portion of the correspondingly mating lid attachment structures are received into respective ones of the plurality of pockets of the second portion of the correspondingly mating lid attachment structures.

17. The mounting bracket of claim 16, wherein the correspondingly mating lid attachment structures include at least one anti-rotation magnet configured to urge the lid into a rotationally locked position whereby the first portion of the correspondingly mating lid attachment structures are positioned within respective ones of the plurality of pockets of the second portion of the correspondingly mating lid attachment structures and to provide a user haptic feedback and/or audible feedback as the user rotates the lid into the rotationally locked position, and wherein the correspondingly mating lid attachment structures include at least one pull-in magnet configured to urge the lid toward the container body and to provide a user haptic feedback and/or audible feedback as the user positions the lid proximate to the container body, whereafter the lid is rotatable into the rotationally locked position.

18. The mounting bracket of claim 15, wherein the accessory-to-be attached comprises a wheel guard configured to permit connecting the wheel guard to the mounting bracket body and connecting the container body to the wheel guard, the wheel guard comprising correspondingly mating wheel guard attachment structures on each of two oppositely facing sides of the wheel guard, the correspondingly mating wheel guard attachment structures comprising a first portion formed on a first side facing the mounting bracket body or a second side facing the container body and having a plurality of protrusions extending radially, parallel to the z-y plane, about the axis of rotation running along the x-axis direction, the correspondingly mating wheel guard attachment structures comprising a second portion formed on an opposite one of the first side facing the mounting bracket body and the second side facing the container body and having a plurality of pockets extending radially, parallel to the z-y plane, about the axis of rotation running along the x-axis direction, and the correspondingly mating wheel guard attachment structures configured so as to permit the wheel guard to be fixedly secured to the mounting bracket body by, first, moving the wheel guard and the mounting bracket body toward one another, and, second, rotating the wheel guard and the mounting bracket body with respect to one another such that the correspondingly mating wheel guard attachment structures engage with the mounting bracket body so as to secure the wheel guard to the mounting bracket body.

19. The mounting bracket of claim 15, wherein the mounting bracket body is configured to attach to a bicycle frame or a bicycle seat post, and wherein the accessory-to-be attached comprises a light emitting diode (LED) light configured to permit connecting the LED light to the mounting bracket body.

20. The mounting bracket of claim 15, wherein the mounting bracket body comprises an rearward portion positioned adjacent to an forward portion, the forward portion configured to attach to the bicycle frame or the bicycle seat post, and the rearward portion having the first or second portion of the correspondingly mating bracket attachment structures formed thereon and having an adjustment rail configured to permit moving the first or second portion of the correspondingly mating bracket attachment structures, with respect to the forward portion, upward and downward along an arcuate path that is parallel to the z-x plane and about a pivot axis that is parallel to the y-axis direction, thereby permitting adjustment of an alignment between the forward and rearward portions of the mounting bracket body, wherein the mounting bracket body includes a locking bolt configured to securely fix a position of the rearward portion in relation to the forward portion.

* * * * *